(12) United States Patent
Morimoto

(10) Patent No.: US 8,835,531 B2
(45) Date of Patent: *Sep. 16, 2014

(54) WATER-BASED INK COMPOSITION FOR INKJET RECORDING

(75) Inventor: Kiyoshi Morimoto, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 706 days.

This patent is subject to a terminal disclaimer.

(21) Appl. No.: 12/698,838

(22) Filed: Feb. 2, 2010

(65) Prior Publication Data

US 2010/0222472 A1    Sep. 2, 2010

(30) Foreign Application Priority Data

Feb. 27, 2009  (JP) ................................. 2009-046601

(51) Int. Cl.
| | |
|---|---|
| A61K 9/16 | (2006.01) |
| C08K 5/34 | (2006.01) |
| C08K 5/3445 | (2006.01) |
| C08K 9/00 | (2006.01) |
| C08L 33/06 | (2006.01) |
| C09B 67/00 | (2006.01) |
| C09D 5/00 | (2006.01) |
| C09D 11/00 | (2014.01) |

(52) U.S. Cl.
USPC ........... 523/160; 523/161; 523/200; 523/205; 523/206; 524/106; 524/543; 524/560

(58) Field of Classification Search
USPC .......... 523/160, 161, 200, 205, 206; 524/106, 524/543, 560
See application file for complete search history.

(56) References Cited

U.S. PATENT DOCUMENTS

| | | | |
|---|---|---|---|
| 5,298,535 A | 3/1994 | Kammer | |
| 2008/0274283 A1* | 11/2008 | Tateishi et al. ................. | 427/256 |
| 2009/0041932 A1* | 2/2009 | Ishizuka et al. ............... | 427/152 |
| 2010/0160504 A1* | 6/2010 | Morimoto et al. ............ | 524/105 |
| 2011/0300344 A1* | 12/2011 | Tateishi ....................... | 428/195.1 |

FOREIGN PATENT DOCUMENTS

| | | |
|---|---|---|
| EP | 1 666 547 A1 | 6/2006 |
| EP | 2 042 570 A1 | 4/2009 |
| JP | 2000-239594 A | 9/2000 |
| JP | 2005-048021 | 2/2005 |
| WO | WO 2006/006703 A1 | 1/2006 |
| WO | WO 2008/056828 A2 | 5/2008 |
| WO | WO 2009/005137 A2 * | 1/2009 |

OTHER PUBLICATIONS

Extended European Search Report dated Nov. 3, 2009 for European Application No. 09010385.4.

* cited by examiner

*Primary Examiner* — Patrick Niland

(74) *Attorney, Agent, or Firm* — Birch, Stewart, Kolasch & Birch, LLP

(57) ABSTRACT

The invention provides a water-based ink for inkjet recording containing at least: a vinyl polymer particle containing an azo compound represented by Formula (1), a tautomer of the azo compound, a salt or a hydrate of the azo compound or the tautomer, or any combination thereof; a 1,2-alkylene glycol having from 4 to 10 carbon atoms; and a polyvalent alcohol that is not the 1,2-alkylene glycol and that has at most 10 carbon atoms.

Formula (1)

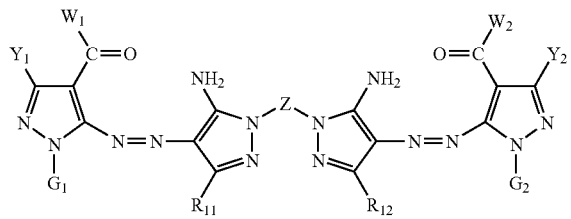

Figure 7:
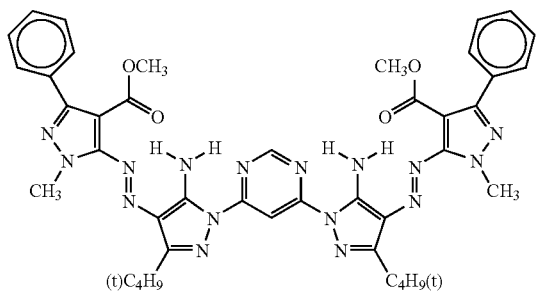
Figure 8:
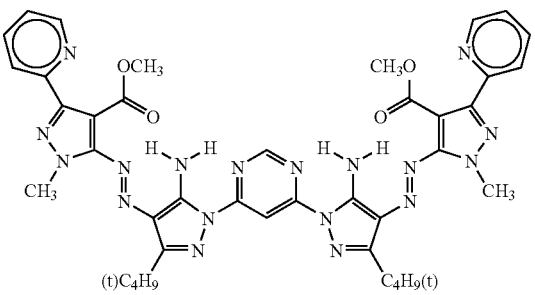
Figure 9:
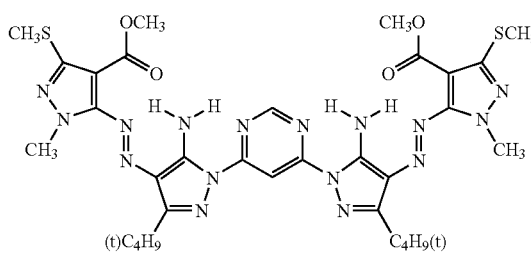
Figure 10:
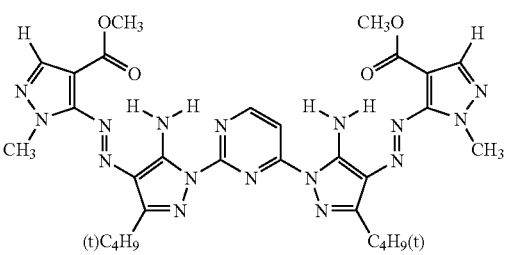
Figure 11:
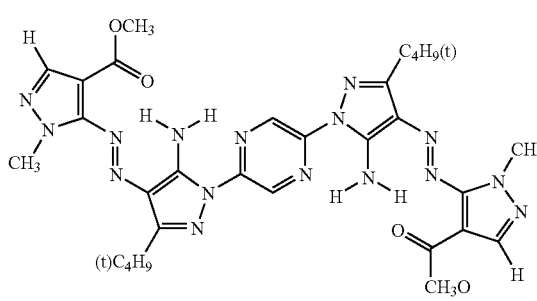
Figure 12:
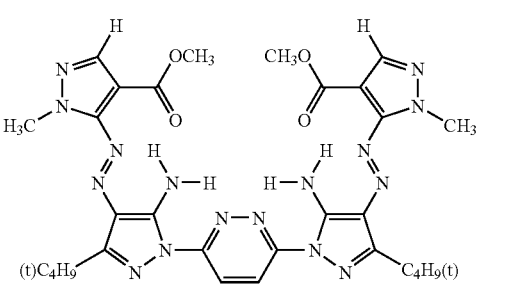
Figure 13:
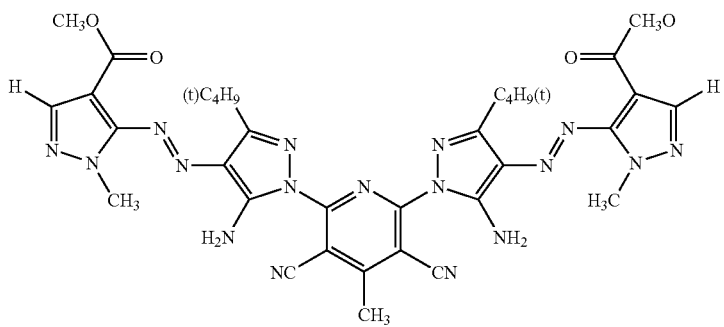
Figure 14:
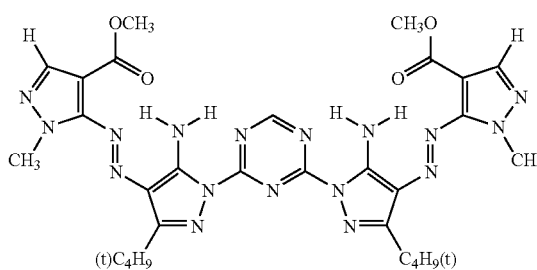
Figure 15:
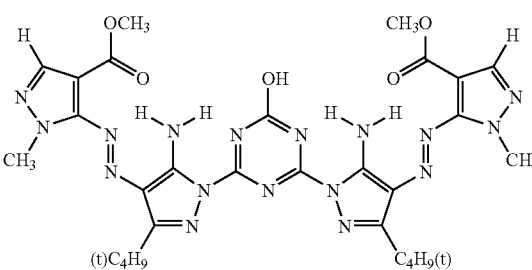
Figure 16:
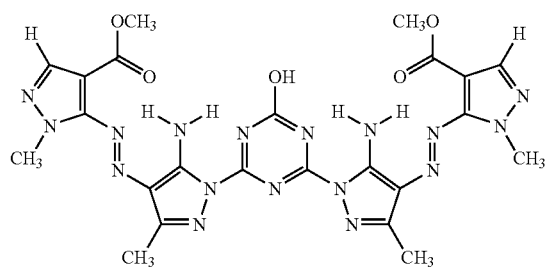
Figure 17:
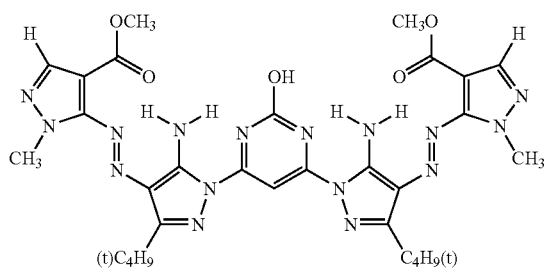
Figure 18:
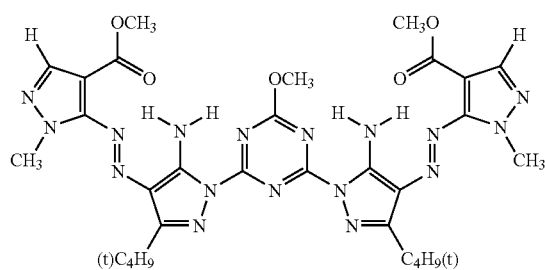
Figure 19:
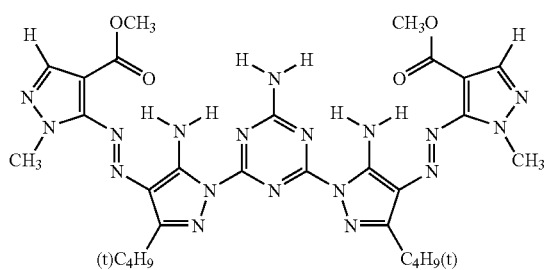
Figure 20:
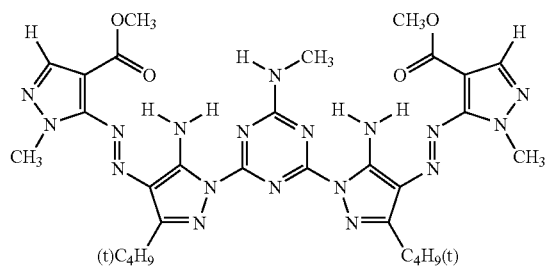
Figure 21:
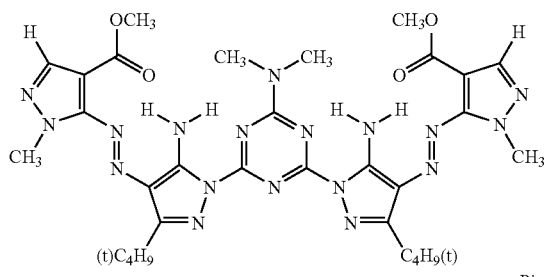
Figure 22:
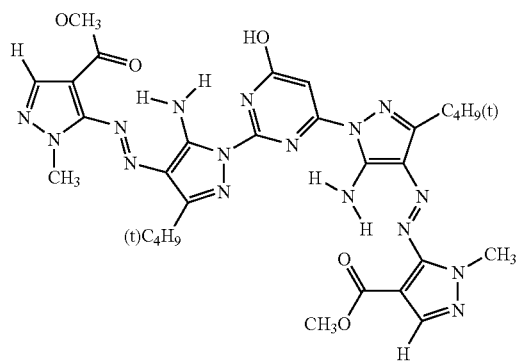
Figure 23:
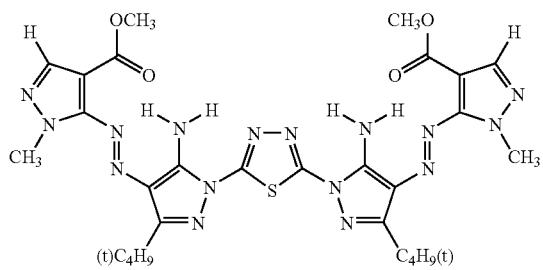
Figure 24:
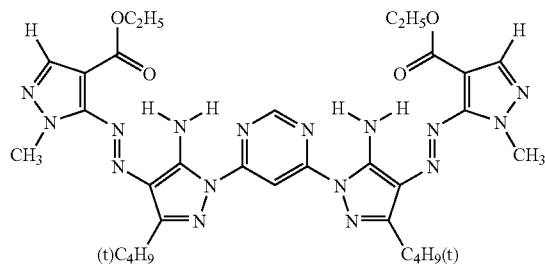
Figure 25:
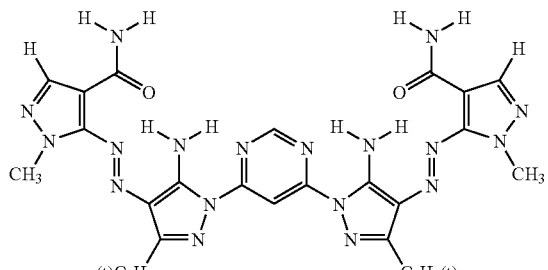
Figure 36:
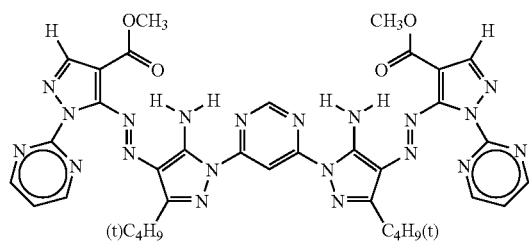
Figure 37:
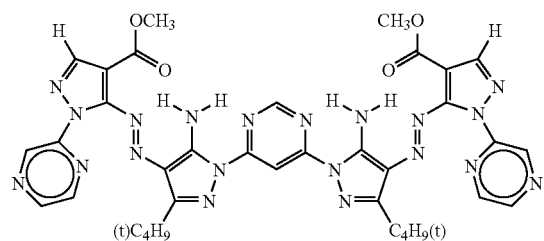
Figure 38:
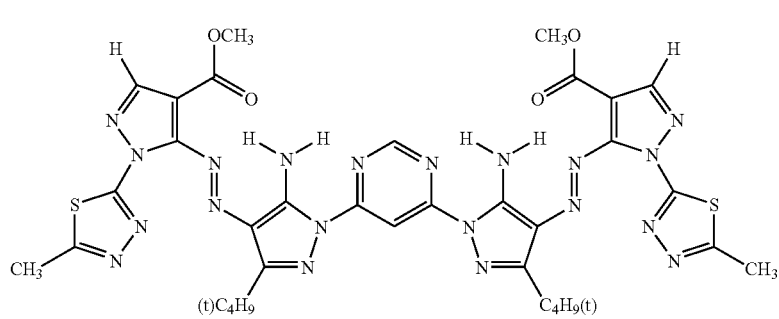
Figure 39:
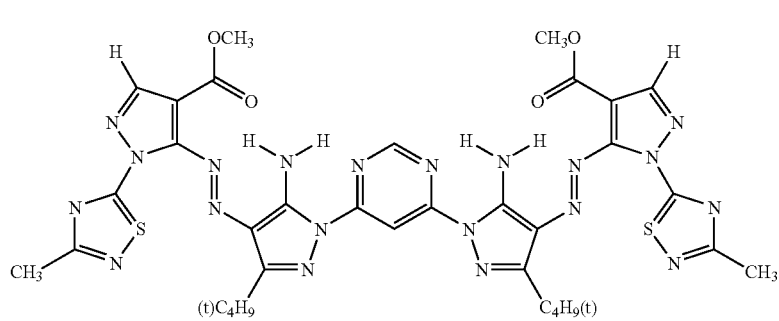
Figure 40:
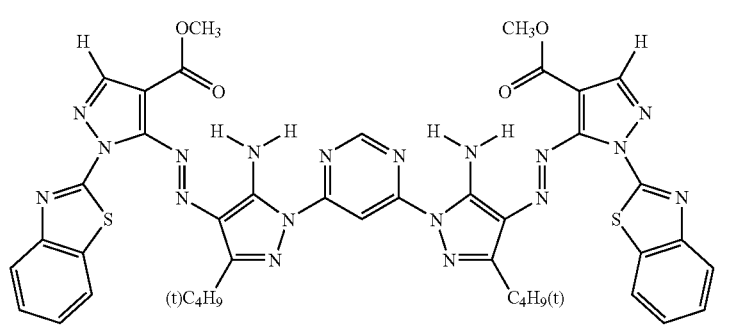
Figure 41:
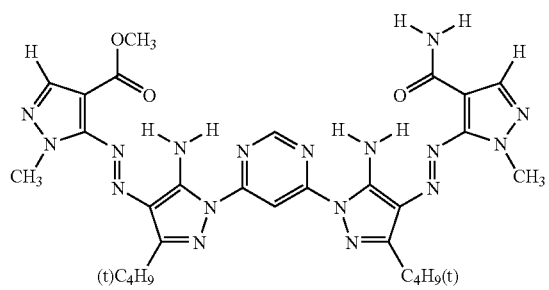
Figure 42:
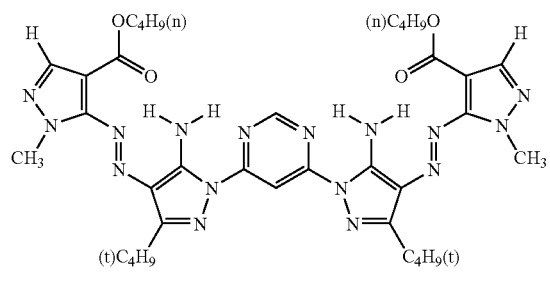

In Formula (1), Z represents a divalent group having a 5- to 8-membered nitrogen-containing heterocycle; $Y_1$, $Y_2$, $R_{11}$ and $R_{12}$ each independently represent a hydrogen atom or a substituent; $G_1$ and $G_2$ each independently represent a hydrogen atom, an alkyl, cycloalkyl, aralkyl, alkenyl, alkynyl, aryl or heterocyclic group; and $W_1$ and $W_2$ each independently represent an alkoxy group, an amino group, an alkyl group, or an aryl group.

9 Claims, No Drawings

WATER-BASED INK COMPOSITION FOR INKJET RECORDING

CROSS-REFERENCE TO RELATED APPLICATION

This application claims priority under 35 USC 119 from Japanese Patent Application No. 2009-046601 filed on Feb. 27, 2009, the disclosure of which is incorporated by reference herein.

BACKGROUND OF THE INVENTION

1. Field of the Invention

The present invention relates to a water-based ink composition for inkjet recording.

2. Related Art

Various media have been used as a recording medium for ink jet recording. A high-definition image quality has been required for not only ink-jet dedicated paper, but also commercially available plain paper and printing media such as fine paper, coat paper, or art paper.

Speeding-up of inkjet recording is also requested from users. Applicability to high-speed printing with a single pass system, that allows recording by scanning with a head one time and is different from shuttle scan system, is demanded.

When the plain paper or the printing media is used, it is suitable to use a pigment as an ink color material which gives fastness such as waterproof properties or light resistance. From the viewpoints of cost and the like, the application of a water-based pigment ink has been variously examined.

Among them, an azo pigment (for example, C.I. Pigment Yellow 74) has been preferably used as a yellow pigment which is used for a water-based pigment ink for inkjet recording.

Aqueous inks for inkjet recording including a pigment, a surfactant, a penetratable organic solvent and water have been disclosed (see, for example, Japanese Patent Application Laid-Open (JP-A) No. 2005-48021). Specifically, JP-A No. 2005-48021 describes a water-based ink containing C. I. Pigment Yellow 74, an acetylene glycol and/or acetylene alcohol-based surfactant, and one or more penetratable organic solvents selected from the group consisting of di(tri)ethylene glycol monobutyl ether, (di)propylene glycol monobutyl ether and 1,2-alkylene glycol, and states that this configuration provides high printing quality on plain paper, recycled paper and coated paper, and further provides glossiness when gloss paper is used, and that an aqueous ink set having inks with well-balanced gas resistance and a printed product having an image formed of a color having low light source dependency can be obtained thereby.

SUMMARY OF THE INVENTION

It is found that when the water-based ink for inkjet recording formed using the pigment dispersion described in JP-A No. 2005-48021 is used after being stored for a long period or after aging at high temperatures, images formed therewith may be unsatisfactory due to irregularities in image density and streak-like image irregularities. This phenomenon is remarkable when image formation is performed under high-speed printing with a single pass system.

The present invention is achieved in view of the above circumstances. The present invention provides a water-based ink for inkjet recording which is excellent in ejection stability after long-term storage or after aging at high temperatures.

One aspect of the present invention is a water-based ink for inkjet recording, the water-based ink comprising: a vinyl polymer particle comprising an azo compound represented by Formula (1), a tautomer of the azo compound, a salt of the azo compound, a salt of the tautomer, a hydrate of the azo compound, a hydrate of the tautomer, or any combination thereof; a 1,2-alkylene glycol having from 4 to 10 carbon atoms; and a polyvalent alcohol that is not the 1,2-alkylene glycol and that has at most 10 carbon atoms.

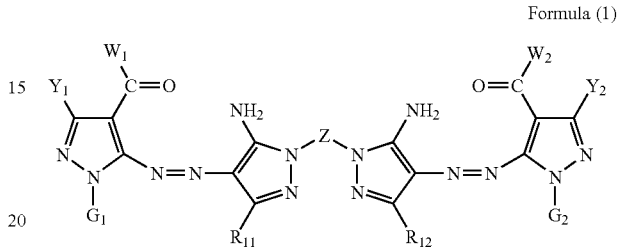

Formula (1)

In Formula (1), Z represents a divalent group having a 5- to 8-membered nitrogen-containing heterocycle; $Y_1$, $Y_2$, $R_{11}$ and $R_{12}$ each independently represent a hydrogen atom or a substituent; $G_1$ and $G_2$ each independently represent a hydrogen atom, an alkyl group, a cycloalkyl group, an aralkyl group, an alkenyl group, an alkynyl group, an aryl group or a heterocyclic group; and $W_1$ and $W_2$ each independently represent an alkoxy group, an amino group, an alkyl group, or an aryl group.

DETAILED DESCRIPTION OF THE INVENTION

The inventors of the invention has found out that a water-based ink for ink jet recording which is excellent in ejection stability even after the long-term storage or after aging at high temperatures and may suppress density unevenness and streaked unevenness may be obtained by employing, in the water-based ink, colored particles containing an azo pigment having a carbonyl group which may form an intramolecular hydrogen bond with the carbon atom adjacent to the carbon atom to which an azo group is bonded and a specific organic solvent.

Water-Soluble Organic Solvent

The water-based ink for inkjet recording of the invention (hereinafter sometimes referred to simply as "ink") contains an aqueous liquid medium containing at least water-soluble organic solvents and water, in which the water-soluble organic solvents include at least one 1,2-alkylene glycol having from 4 to 10 carbon atoms and at least one polyvalent alcohol that is not the 1,2-alkylene glycol and that having 10 or fewer carbon atoms as water-soluble organic solvents.

The water-soluble organic solvents are used as, for example, an anti-drying agent, a wetting agent and/or a penetration accelerating agent. Specifically, the water-soluble organic solvents may work as an anti-drying agent(s) for preventing clogging due to drying of the water-based ink for inkjet recording at an ink jet orifice of a nozzle. In view of employing the water-soluble organic solvent(s) as an anti-drying agent and a wetting agent, the water-soluble organic solvent(s) may preferably have a lower vapor pressure than that of water. The water-soluble organic solvent(s) may also be employed as a penetration accelerating agent for improving penetration of the water-based ink for inkjet recording into paper.

The 1,2-alkylene glycol used in the invention has from 4 to 10 carbon atoms, and preferably has from 4 to 8 carbon atoms.

Preferable examples of the 1,2-alkylene glycol having from 4 to 10 carbon atoms include 1,2-butanediol, 3,3-dimethyl-1,2-butanediol, 1,2-pentanediol, 4-methyl-1,2-pentanediol, 1,2-hexanediol, 1,2-heptanediol, 1,2-octanediol and 1,2-decanediol, and more preferable examples thereof include 1,2-hexanediol and 4-methyl-1,2-pentanediol.

One kind or a combination of two or more kinds of the 1,2-alkylene glycol having from 4 to 10 carbon atoms may be used in the invention. The content of the 1,2-alkylene glycol having from 4 to 10 carbon atoms is preferably from 0.5 mass % to 10 mass % based on the total mass of the water-based ink.

In embodiments, the water-based ink of the invention preferably contains, as the 1,2-alkylene glycol having from 4 to 10 carbon atoms, 1,2-hexanediol and/or 4-methyl-1,2-pentanediol in the total amount of from 0.5 mass % to 10 mass % based on the total mass of the water-based ink in view of ejection stability.

The polyvalent alcohol that is not the 1,2-alkylene glycol used in the invention has 10 or fewer carbon atoms, and preferably has from 3 to 9 carbon atoms.

Preferable examples of the polyvalent alcohol having 10 or fewer carbon atoms other than 1,2-alkylene glycol include diethylene glycol, triethylene glycol, tetraethylene glycol, dipropylene glycol, tripropylene glycol, 1,3-propanediol, 2-butyl-2-ethyl-1,3-propanediol, 1,3-butanediol, 1,5-pentanediol, hexylene glycol, octylene glycol, 1,2,6-hexanetriol, 2-butene-1,4-diol, glycerine, trimethylolethane and trimethylolpropane, and more preferable examples thereof include glycerine, trimethylolpropane and 2-butyl-2-ethyl-1,3-propanediol.

In the invention, the polyvalent alcohol may be used singly or in a combination of two or more thereof. The content of the polyvalent alcohol is preferably from 5 mass % to 20 mass % based on the total mass of the water-based ink.

In embodiments, the water-based ink of the invention preferably contains, as the polyvalent alcohol having 10 or fewer carbon atoms, glycerine, trimethylolpropane, and/or 2-butyl-2-ethyl-1,3-propanediol in the total amount of from 5 mass % to 20 mass % based on the total mass of the water-based ink in view of stability.

In embodiments, the ink of the invention may further contains the glycol ether represented by the following Formula (1) in addition to the 1,2-alkylene glycol having from 4 to 10 carbon atoms and the polyvalent alcohol having 10 or fewer carbon atoms other than the 1,2-alkylene glycol. In preferable embodiments, the content of the glycol ether represented by Formula (1) may be from 0.5 mass % to 15 mass % based on the total mass of the water-based ink.

$$R^1O-(AO)_m-H \qquad \text{Formula (1)}$$

In Formula (1), m represents an integer of 1 or more, A represents —$CH_2CH_2$— (a moiety derived from ethylene) or —$CH_2CH(CH_3)$— (a moiety derived from propylene), and $R^1$ represents an alkyl group having 8 or fewer carbon atoms.

In preferable embodiments, m may represent an integer of 1 to 3, and $R^1$ may represent an alkyl group having from 1 to 4 carbon atoms in view of the ejection stability of the ink.

Examples of the glycol ether represented by Formula (1) may include ethylene glycol monomethyl ether, ethylene glycol monoethyl ether, ethylene glycol monobutyl ether, ethylene glycol monomethyl ether acetate, diethylene glycol monomethyl ether, diethylene glycol monoethyl ether, diethylene glycol mono-n-propyl ether, ethylene glycol mono-iso-propyl ether, diethylene glycol mono-iso-propyl ether, ethylene glycol mono-n-butyl ether, ethylene glycol mono-t-butyl ether, diethylene glycol mono-t-butyl ether, triethylene glycol monomethyl ether, triethylene glycol monoethyl ether, triethylene glycol mono-n-propyl ether, triethylene glycol mono-iso-propyl ether, triethylene glycol mono-n-butyl ether, triethylene glycol mono-t-butyl ether, propylene glycol monomethyl ether, propylene glycol monoethyl ether, propylene glycol mono-t-butyl ether, propylene glycol mono-n-propyl ether, propylene glycol mono-iso-propyl ether, dipropylene glycol monomethyl ether, dipropylene glycol monoethyl ether, dipropylene glycol mono-n-propyl ether, dipropylene glycol mono-iso-propyl ether, tripropylene glycol monomethyl ether, tripropylene glycol monoethyl ether, tripropylene glycol mono-n-propyl ether and tripropylene glycol mono-iso-propyl ether. More preferable examples among these include triethylene glycol mono-n-butyl ether.

In embodiments, the glycol ether represented by Formula (1) may be used singly or in a combination of two or more thereof. The content ratio of the glycol ether may be preferably from 0.5 mass % to 15 mass %.

The content of the total amount of the water-soluble organic solvents is from 5 mass % to 60 mass %, preferably from 10 mass % to 40 mass % based on the total mass of the water-based ink of the invention.

The content of water used in the invention is not specifically limited. In embodiments, the content of water may be preferably from 10 mass % to 99 mass %, more preferably from 30 mass % to 80 mass %, and further preferably from 50 mass % to 70 mass %, based on the total mass of the water-based ink.

Azo Pigment

The azo pigment to be used in the invention is typically a compound represented by Formula (1). The azo pigment may be a compound having the structure represented Formula (1), a tautomer of the compound, a salt of the compound, a salt of the tautomer, a hydrate of the compound, a hydrate of the tautomer, or any combination thereof.

The pigment molecule of the compound represented by Formula (1) easily causes intramolecular or intermolecular interaction due to its specific structure. Since the compound has a low solubility in water or organic solvents, it may be used as the preferable azo pigment in exemplary embodiments of the invention.

The pigment is used by being finely-dispersed, as a solid particle such as a molecular aggregate, in a medium, and is different from a dye used by being dissolved in water or an organic solvent to be in a molecular dispersion state.

Formula (1)

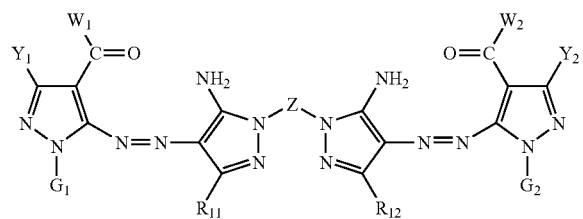

In Formula (1), Z represents a divalent group having a 5- to 8-membered nitrogen-containing heterocycle; $Y_1$, $Y_2$, $R_{11}$ and $R_{12}$ each independently represent a hydrogen atom or a substituent; $G_1$ and $G_2$ each independently represent a hydrogen atom, an alkyl group, a cycloalkyl group, an aralkyl group, an alkenyl group, an alkynyl group, an aryl group or a heterocyclic group; and $W_1$ and $W_2$ each independently represent an alkoxy group, an amino group, an alkyl group, or an aryl group.

In Formula (1), Z represents a divalent group having a 5- to 8-membered nitrogen-containing heterocycle. Preferable examples of the nitrogen-containing heterocycle, each of which may have one or more substituent at any position(s) thereof, include a pyrrole ring, a pyrazole ring, a triazole ring, an imidazole ring, a thiazole ring, an isothiazole ring, an oxazole ring, an isoxazole ring, a thiadiazole ring, a thiophene ring, a furan ring, a pyridine ring, a pyrimidine ring, a triazine ring, and a pyridazine ring. More preferable examples include a 6-membered nitrogen-containing heterocycle such as a pyridine ring, a pyrimidine ring, or an s-triazine ring. Particularly preferable examples of Z include a divalent group having a pyrimidine ring.

When Z is a divalent group having a 6-membered nitrogen-containing heterocycle, the intramolecular and intermolecular interactions of pigment molecules may be more easily improved from the viewpoint of hydrogen bonding and planarity of the molecules.

In embodiments, the divalent group having a 5- to 8-membered nitrogen-containing heterocycle represented by Z may be condensed.

In Formula (1), $Y_1$ and $Y_2$ each independently represent a hydrogen atom or a substituent. Examples of the substituent include a halogen atom, an alkyl group, an aralkyl group, an alkenyl group, an alkynyl group, an aryl group, a heterocyclic group, a cyano group, a hydroxy group, a nitro group, an alkoxy group, an aryloxy group, a silyloxy group, a heterocyclic oxy group, an acyloxy group, a carbamoyloxy group, an alkoxycarbonyloxy group, an aryloxycarbonyloxy group, an amino group, an acylamino group, an aminocarbonylamino group, an alkoxycarbonylamino group, an aryloxycarbonylamino group, a sulfamoylamino group, an alkylsulfonylamino group, an arylsulfonylamino group, a mercapto group, an alkylthio group, an arylthio group, a heterocyclic thio group, a sulfamoyl group, an alkylsulfinyl group, an arylsulfinyl group, an alkylsulfonyl group, an arylsulfonyl group, an acyl group, an aryloxycarbonyl group, an alkoxycarbonyl group, a carbamoyl group, an arylazo group, a heterocyclic azo group, an imido group, a phosphino group, a phosphinyl group, a phosphinyloxy group, a phosphinylamino group, and a silyl group.

Herein, an "alkyl group" may be a straight chain alkyl group, a branched alkyl group, or a cyclic alkyl group, and may be a substituted- or unsubstituted-alkyl group. The scope of an alkyl group encompass a cycloalkyl group, a bicycloalkyl group, and those having many ring structures such as a tricyclo structure. An alkyl group contained in a substituent (such as an alkyl group of an alkoxy group, an alkyl group of an alkylcarbonyl group or an alkyl group of an alkylsulfonyl group) also has this definition.

Preferable examples of $Y_1$ and $Y_2$ include a hydrogen atom, an alkyl group (such as a methyl group), an aryl group (such as a phenyl group), a heterocyclic group (such as a 2-pyridyl group), and an alkylthio group (such as a methylthio group), more preferable examples thereof include a hydrogen atom, a methyl group, a phenyl group, and a methylthio group, and particularly preferable examples thereof include a hydrogen atom. $Y_1$ and $Y_2$ may represent the same groups or groups which are different from each other.

In Formula (1), $R_{11}$ and $R_{12}$ each independently represent a hydrogen atom or a substituent. Examples of the substituent represented by $R_{11}$ or $R_{12}$ include a straight chain or branched alkyl group having from 1 to 12 carbon atoms such as methyl, ethyl, n-propyl, propyl, n-butyl, i-butyl, sec-butyl, t-butyl, 2-ethylhexyl, 2-methylsulfonylethyl, 3-phenoxypropyl, or trifluoromethyl; a straight chain or branched aralkyl group having from 7 to 18 carbon atoms such as a benzyl group; a straight chain or branched alkenyl group having from 2 to 12 carbon atoms such as a vinyl group; a straight chain or branched alkynyl group having from 2 to 12 carbon atoms such as an ethynyl group; a straight chain or branched cycloalkyl group having from 3 to 12 carbon atoms such as a cyclopentyl group; a straight chain or branched cycloalkenyl group having from 3 to 12 carbon atoms such as a cyclopentenyl group; a halogen atom such as a chlorine atom or a bromine atom; an aryl group such as phenyl, 4-t-butylphenyl, or 2,4-di-t-amylphenyl; a heterocyclic group such as imidazolyl, pyrazolyl, triazolyl, 2-furyl, 2-thienyl, 2-pyrimidinyl, or 2-benzothiazolyl; a cyano group; a hydroxy group; a nitro group; a carboxy group; an amino group; an alkyloxy group such as methoxy, ethoxy, 2-methoxyethoxy, or 2-methylsulfonylethoxy; an aryloxy group such as phenoxy, 2-methylphenoxy, 4-t-butylphenoxy, 3-nitrophenoxy, 3-t-butyloxycarbonylphenoxy, or 3-methoxycarbonylphenyloxy; an acylamino group such as acetamido, benzamido, or 4-(3-t-butyl-4-hydroxyphenoxy)butaneamido; an alkylamino group such as methylamino, butylamino, diethylamino, or methylbutylamino; an arylamino group such as phenylamino or 2-chloroanilino; a ureido group such as phenylureido, methylureido, or N,N-dibutylureido; a sulfamoylamino group such as N,N-dipropylsulfamoylamino; an alkylthio group such as methylthio, octylthio, or 2-phenoxyethylthio), an arylthio group such as phenylthio, 2-butoxy-5-t-octylphenylthio, or 2-carboxyphenylthio; an alkyloxycarbonylamino group such as methoxycarbonylamino; an alkylsulfonylamino group and an arylsulfonylamino group such as methylsulfonylamino, phenylsulfonylamino, or p-toluenesulfonylamino; a carbamoyl group such as N-ethylcarbamoyl or N,N-dibutylcarbamoyl; a sulfamoyl group such as N-ethylsulfamoyl, N,N-dipropylsulfamoyl, or N-phenylsulfamoyl; a sulfonyl group such as methylsulfonyl, octylsulfonyl, phenylsulfonyl, or p-toluenesulfonyl; an alkyloxycarbonyl group such as methoxycarbonyl or butyloxycarbonyl; a heterocyclic oxy group such as 1-phenyltetrazole-5-oxy or 2-tetrahydropyranyloxy; an azo group such as phenylazo, 4-methoxyphenylazo, 4-pivaloylaminophenylazo, or 2-hydroxy-4-propanoylphenylazo; an acyloxy group such as acetoxy; a carbamoyloxy group such as N-methylcarbamoyloxy or N-phenylcarbamoyloxy; a silyloxy group such as trimethylsilyloxy or dibutylmethylsilyloxy; an aryloxycarbonylamino group such as phenoxycarbonylamino; an imido group such as N-succinimido or N-phthalimido; a heterocyclic thio group such as 2-benzothiazolylhio, 2,4-di-phenoxy-1,3,5-triazole 6-thio, or 2-pyridylthio; a sulfinyl group such as 3-phenoxypropylsulfinyl; a phosphonyl group such as phenoxyphosphonyl, octyloxyphosphonyl, or phenylphosphonyl; an aryloxycarbonyl group such as phenoxycarbonyl; an acyl group such as acetyl, 3-phenylpropanoyl, or benzoyl; and an ionic hydrophilic group such as a carboxy group, a sulfo group, a phosphono group or a quaternary ammonium group.

Preferable examples of $R_{11}$ and $R_{12}$ in Formula (1) include a substituted or unsubstituted acylamino group having from 1 to 8 carbon atoms, a substituted or unsubstituted alkyl group having from 1 to 12 carbon atoms, a substituted or unsubstituted aryl group having from 6 to 18 carbon atoms, and a substituted or unsubstituted heterocyclic group having from 4 to 12 carbon atoms, more preferable examples thereof include a straight chain or branched alkyl group having from 1 to 8 carbon atoms, and even more preferable examples thereof include a methyl group and a t-butyl group, and particularly preferable examples thereof include a t-butyl group. $R_{11}$ and $R_{12}$ may represent the same groups or groups which are different from each other.

$G_1$ and $G_2$ each independently represent a hydrogen atom, an alkyl group, a cycloalkyl group, an aralkyl group, an alkenyl group, an alkynyl group, an aryl group, or a heterocyclic group. Preferable examples of $G_1$ and $G_2$ include a hydrogen atom, a methyl group, an ethyl group, a n-propyl group, an i-propyl group, a t-butyl group, a cyclopropyl group, a benzyl group, a 2-phenethyl group, a vinyl group, an allyl group, an ethynyl group, a propargyl group, a phenyl group, a p-tolyl group, a naphthyl group, a pyridyl group, a pyrimidinyl group, and a pyrazinyl group. More preferable examples thereof include a hydrogen atom, a methyl group, a phenyl group, a pyridyl group, a pyrimidinyl group, a pyrazinyl group. Particularly preferable examples among these include a methyl group, a 2-pyridyl group, a 2,6-pyrimidinyl group, and a 2,5-pyrazinyl group.

The alkyl group represented by $G_1$ or $G_2$ preferably has 5 or fewer carbon atoms, more preferably has 3 or fewer carbon atoms, and is particularly preferably a methyl group. $G_1$ and $G_2$ may represent the same groups or groups which are different from each other.

$W_1$ and $W_2$ each independently represent an alkoxy group, an amino group, an arylamino group pr a heterocyclic amino group.

Preferable examples of the alkoxy group represented by $W_1$ or $W_2$ include a substituted or unsubstituted alkoxy group having from 1 to 30 carbon atoms such as a methoxy group, an ethoxy group, an i-propoxy group, a t-butoxy group, an n-octyloxy group, or a 2-methoxyethoxy group.

Examples of the amino group represented by $W_1$ or $W_2$ include an alkylamino group, an arylamino group, and a heterocyclic amino group. Preferable examples thereof include an amino group, a substituted or unsubstituted alkylamino group having from 1 to 30 carbon atoms, a substituted or unsubstituted anilino group having from 6 to 30 carbon atoms, and specific examples thereof include a methylamino group, a dimethylamino group, an anilino group, an N-methyl-anilino group, and a diphenylamino group.

When $W_1$ or $W_2$ represents an alkyl group, the alkyl group may be a straight chain alkyl group, a branched alkyl group, or a cyclic alkyl group, and may be a substituted- or unsubstituted-alkyl group. The scope of the alkyl group encompass a cycloalkyl group, a bicycloalkyl group, and those having many ring structures such as a tricyclo structure.

Preferable examples of the alkyl group include an alkyl group having from 1 to 30 carbon atoms such as a methyl group, an ethyl group, an n-propyl group, an i-propyl group, a t-butyl group, an n-octyl group, an eicosyl group, a 2-chloroethyl group, a 2-cyanoethyl group, or a 2-ethylhexyl group. Preferable examples of the cycloalkyl group include a substituted or unsubstituted cycloalkyl group having from 3 to 30 carbon atoms such as a cyclohexyl group, a cyclopentyl group, or a 4-n-dodecylcyclohexyl group. Preferable examples of the bicycloalkyl group include a substituted or unsubstituted bicycloalkyl group having from 5 to 30 carbon atoms, namely, a monovalent group in which a hydrogen atom is removed from bicycloalkane having from 5 to 30 carbon atoms, and specific examples thereof include a bicyclo[1.2.2]heptan-2-yl group and a bicyclo[2.2.2]octan-3-yl group.

Preferable examples of the aryl group represented by $W_1$ or $W_2$ include a substituted or unsubstituted aryl group having from 6 to 30 carbon atoms such as a phenyl group, a p-tolyl group, a naphthyl group, an m-chlorophenyl group, or an o-hexadecanoylaminophenyl group.

In preferable embodiments, $W_1$ and $W_2$ each independently represent an alkoxy group, an amino group or an alkyl group. In more preferable embodiments, $W_1$ and $W_2$ each independently represent an alkoxy group or an amino group. In still more preferable embodiments, $W_1$ and $W_2$ each independently represent an alkoxy group having 5 or fewer carbon atoms, an amino group (—$NH_2$), or an alkylamino group having 5 or fewer carbon atoms. In further preferable embodiments, $W_1$ and $W_2$ each independently represent an alkoxy group having 3 or fewer carbon atoms, an amino group, or an alkylamino group having 3 or fewer carbon atoms. In particularly preferable embodiments, $W_1$ and $W_2$ each independently represent a methoxy group. $W_1$ and $W_2$ may represent the same groups or groups which are different from each other.

When $W_1$ and $W_2$ each independently represent an alkoxy group having 5 or fewer carbon atoms, an amino group (—$NH_2$), or an alkylamino group having 5 or fewer carbon atoms, a pigment molecule easily forms a stronger hydrogen bond in the molecule and/or between the molecules, which is preferable from the viewpoints of a good hue and high fastness (for example, fastness against light, gas, heat, water, or chemicals).

In embodiments, $Z, Y_1, Y_2, R_{11}, R_{12}, G_1, G_2, W_1$, and $W_2$ may each independently have a substituent. Examples of the substituent include a halogen atom, an alkyl group, an aralkyl group, an alkenyl group, an alkynyl group, an aryl group, a heterocyclic group, a cyano group, a hydroxy group, a nitro group, an alkoxy group, an aryloxy group, a silyloxy group, a heterocyclic oxy group, an acyloxy group, a carbamoyloxy group, an alkoxycarbonyloxy group, an aryloxycarbonyloxy group, an amino group, an acylamino group, an aminocarbonylamino group, an alkoxycarbonylamino group, an aryloxycarbonylamino group, a sulfamoylamino group, an alkylsulfonylamino group, an arylsulfonylamino group, a mercapto group, an alkylthio group, an arylthio group, a heterocyclic thio group, a sulfamoyl group, an alkylsulfinyl group, an arylsulfinyl group, an alkylsulfonyl group, an arylsulfonyl group, an acyl group, an aryloxycarbonyl group, an alkoxycarbonyl group, a carbamoyl group, an arylazo group, a heterocyclic azo group, an imido group, a phosphino group, a phosphinyl group, a phosphinyloxy group, a phosphinylamino group, and a silyl group.

The scope of the azo pigment used in the invention includes a tautomer of the azo compound represented by Formula (1). Formula (1) is shown as canonical structures among several tautomers with chemically acceptable structures. Tautomers having a structure other than the explicitly shown one may also be used in the invention. In embodiments, the azo pigment may be a mixture containing a plurality of such tautomers.

Examples of the azo pigment include a compound represented by the following Formula (1'), which is an azo-hydrazone tautomer of the compound represented by Formula (1). The use of the compound represented by Formula (1'), which is a tautomer of the azo compound represented by Formula (1), is included in the scope of the invention.

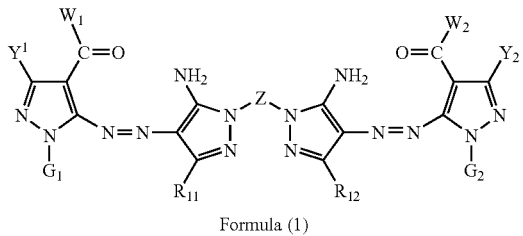

Formula (1)

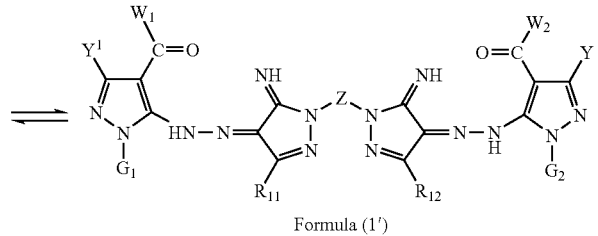

Formula (1')

$R_{11}$, $R_{12}$, $W_1$, $W_2$, $Y_1$, $Y_2$, $G_1$, $G_2$, and Z in Formula (1') respectively have the same definition as corresponding $R_{11}$, $R_{12}$, $W_1$, $W_2$, $Y_1$, $Y_2$, $G_1$, $G_2$, and Z in Formula (1).

In preferable embodiments, at least one of various substituents of the compound represented by Formula (1) is selected from the above-described preferable groups. The larger the number of substituents selected from the above-described preferable groups is, the more preferable it is. In particularly preferable embodiments, all substituents of the compound represented by Formula (1) are selected from the above-described preferable groups.

Particularly preferable examples of the azo compound represented by Formula (1) include those satisfying at least one of the following (1) to (5).

(1) $W_1$ and $W_2$ are each independently an alkoxy group (such as a methoxy group, an ethoxy group, an i-propoxy group, or a t-butoxy group), an amino group (such as an —$NH_2$ group, a methylamino group, a dimethylamino group, or an anilino group), an alkyl group (such as a methyl group, an ethyl group, an n-propyl group, an i-propyl group, a t-butyl group, or a cyclopropyl group) or an aryl group (such as a phenyl group, a p-tolyl group, or a naphthyl group). In preferable embodiments, $W_1$ and $W_2$ are each independently an alkoxy group, an amino group, or an alkyl group. In more preferable embodiments, $W_1$ and $W_2$ are each independently an alkoxy group or an amino group. In still more preferable embodiments, $W_1$ and $W_2$ are each independently an alkoxy group having 5 or fewer carbon atoms, an amino group (an —$NH_2$ group), or an alkylamino group having 5 or fewer carbon atoms. In particularly preferable embodiments, $W_1$ and $W_2$ are each independently an alkoxy group having 3 or fewer carbon atoms, an amino group (an —$NH_2$ group), or an alkylamino group having 3 or fewer carbon atoms. In specifically preferable embodiments, $W_1$ and $W_2$ are each independently a methoxy group (an —$OCH_3$ group).

(2) $R_{11}$ and $R_{12}$ are each independently a hydrogen atom or a substituent (such as a substituted or unsubstituted acylamino group having from 1 to 8 carbon atoms, a substituted or unsubstituted alkyl group having from 1 to 12 carbon atoms, a substituted or unsubstituted aryl group having from 6 to 18 carbon atoms, or a substituted or unsubstituted heterocyclic group having from 4 to 12 carbon atoms). In preferable embodiments, $R_{11}$ and $R_{12}$ are each independently a straight chain or branched alkyl group having from 1 to 8 carbon atoms. In more preferable embodiments, $R_{11}$ and $R_{12}$ are each independently a methyl group, an i-propyl group, or a t-butyl group. In particularly preferable embodiments, $R_{11}$ and $R_{12}$ are each independently a t-butyl group.

(3) Z represents a divalent group having a 5- to 8-membered heterocyclic ring and may be condensed. In preferable embodiments, Z is a 5- or 6-membered substituted or unsubstituted nitrogen-containing heterocyclic group such as a pyrrole ring, a pyrazole ring, a trirazole ring, an imidazole ring, a thiazole ring, an isothiazole ring, an oxazole ring, an isoxazole ring, a thiadiazole ring, a thiophene ring, a furan ring, a pyridine ring, a pyrimidine ring, a triazine ring, or a pyridazine ring. In more preferable embodiments, Z is a 6-membered nitrogen-containing heterocyclic group having from 3 to 10 carbon atoms. Preferable examples of the heterocycle include a pyridine ring, a pyrimidine ring, an s-triazine ring, a pyridazine ring, and a pyrazine ring. More preferable examples of the heterocycle include a pyridine ring, a pyrimidine ring, an s-triazine ring, a pyridazine ring, and a pyrazine ring. Further preferable examples of the heterocycle include a pyrimidine ring and an s-triazine ring. Particularly preferable examples of the heterocycle include a pyrimidine ring.

(4) $G_1$ and $G_2$ each independently represent a hydrogen atom, an alkyl group, a cycloalkyl group, an aralkyl group, an alkenyl group, an alkynyl group, an aryl group, or a heterocyclic group. In preferable embodiments, $G_1$ and $G_2$ each independently represent a hydrogen atom, a methyl group, an ethyl group, a n-propyl group, an i-propyl group, a t-butyl group, a cyclopropyl group, a benzyl group, a 2-phenethyl group, a vinyl group, an allyl group, an ethynyl group, a propargyl group, a phenyl group, a p-tolyl group, a naphthyl group, a pyridyl group, a pyrimidinyl group, or a pyrazinyl group. In more preferable embodiments, $G_1$ and $G_2$ each independently represent a hydrogen atom, a methyl group, a phenyl group, a pyridyl group, a pyrimidinyl group, or a pyrazinyl group. In particularly preferable embodiments, $G_1$ and $G_2$ each independently represent a methyl group, a 2-pyridyl group, a 2,6-pyrimidinyl group, or a 2,5-pyrazinyl group.

The alkyl group represented by $G_1$ or $G_2$ preferably has 5 or fewer carbon atoms, more preferably has 3 or fewer carbon atoms, and is particularly preferably a methyl group.

(5) $Y_1$ and $Y_2$ each independently represent a hydrogen atom, an alkyl group (such as a methyl group), an ryl group (such as a phenyl group), a heterocyclic group (such as a 2-pyridyl group), or an alkylthio group (such as a methylthio group). In preferable embodiments, $Y_1$ and $Y_2$ each independently represent a hydrogen atom, a methyl group, a phenyl group, or a methylthio group. In more preferable embodiments, $Y_1$ and $Y_2$ each independently represent a hydrogen atom.

Preferable examples of the azo compound represented by Formula (1) include the azo compound represented by the following Formula (2).

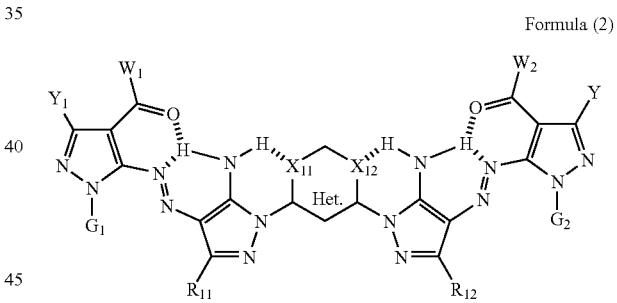

Formula (2)

$G_1$, $G_2$, $R_{11}$, $R_{12}$, $W_1$, $W_2$, $Y_1$, and $Y_2$ in Formula (2) respectively have the same definition as that of corresponding $G_1$, $G_2$, $R_{11}$, $R_{12}$, $W_1$, $W_2$, $Y_1$, and $Y_2$ in Formula (1).

$X_{11}$ and $X_{12}$ each independently represent a heteroatom in a divalent group (Het.) derived from a nitrogen-containing heterocycle represented by Z in Formula (4).

There are a lot of tautomers of the azo compound represented by Formula (1) and employable in the invention.

In preferable embodiments, the azo compound represented by Formula (1) may have a substituent which forms an intramolecular hydrogen bond or an intramolecular cross hydrogen bond. It is preferable that the azo compound represented by Formula (1) has at least one of the substituent which forms an intramolecular cross hydrogen bond. It is more preferable that the azo pigment has at least three of the substituent which forms an intramolecular hydrogen bond. It is particularly preferable that the azo pigment has at least three of the substituent which forms an intramolecular hydrogen bond and at least two of the hydrogen bonds form an intramolecular cross hydrogen bond.

The reason why the azo compound represented by Formula (2) is preferable may be that, in the structure Formula (2), a nitrogen atom which forms a heterocyclic group, a hydrogen atom, and a heteroatom (a nitrogen atom of an azo group or its tautomer, i.e., hydrazone group, an oxygen atom of a carbonyl group or a nitrogen atom of an amino group) contained in an azo pigment structure easily form at least one intramolecular cross hydrogen bond (intramolecular hydrogen bond).

Further preferably, as shown in Formula (2), a nitrogen atom which forms a heterocyclic group, a hydrogen atom of an amino group, and a heteroatom (for example, a nitrogen atom of an azo group or its tautomer, i.e., hydrazone group, an oxygen atom of a carbonyl group or a nitrogen atom of an amino group) contained in an azo pigment structure easily form at least four intramolecular hydrogen bonds and easily form at least two intramolecular cross hydrogen bonds.

As a result, the planarity of the molecules is improved and intramolecular and intermolecular interactions are improved. For example, the crystallinity of the azo compound represented by Formula (2) becomes high (namely, the azo pigment becomes to easily form a higher order structure), so that performances required to the pigment such as lightfastness, thermal stability, wet heat stability, waterproof properties, gas resistance or solvent resistance may be significantly improved.

An isotope (such as $^2H$, $^3H$, $^{13}C$, or $^{15}N$) may be contained in the compound represented by Formula (1).

Hereinafter, Pig.-1 to Pig.-46 will be exemplified as specific examples of the azo pigments represented by Formula (1). However, the azo pigment to be used in the invention is not limited thereto. The structures of the following specific examples are respectively shown as a canonical structure among several tautomers with chemically acceptable structures, although the azo pigment may have a structure of any one of tautomers thereof.

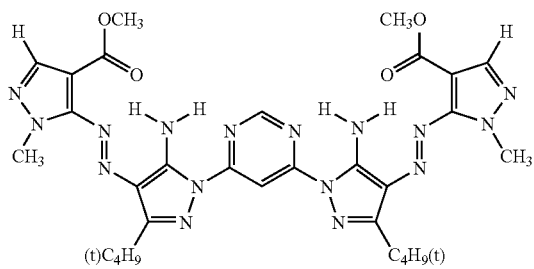

Pig.-1

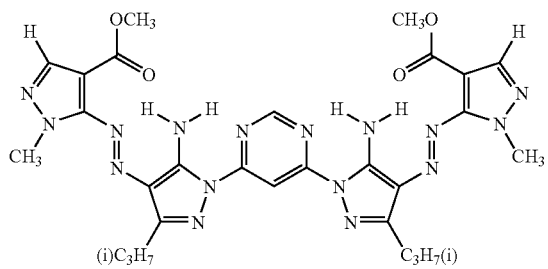

Pig.-2

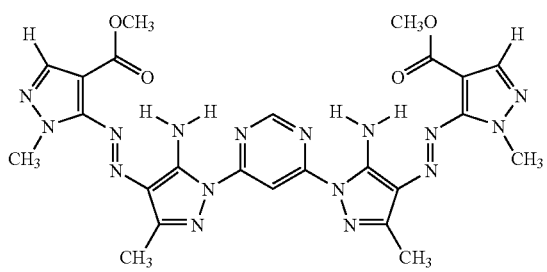

Pig.-3

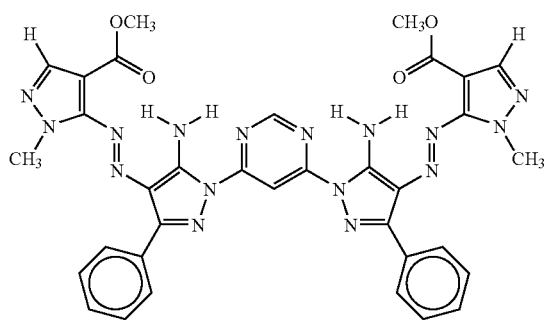

Pig.-4

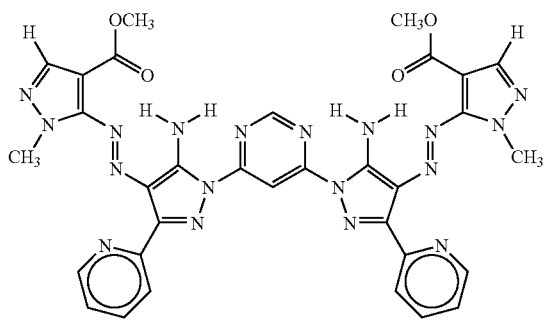

Pig.-5

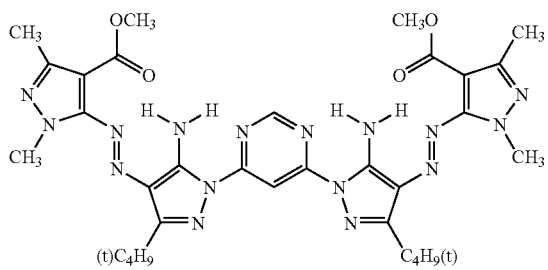

Pig.-6

-continued

-continued

-continued
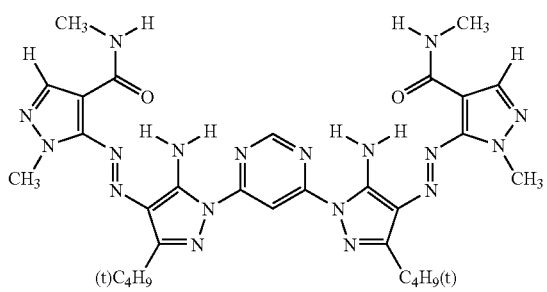
Pig.-26
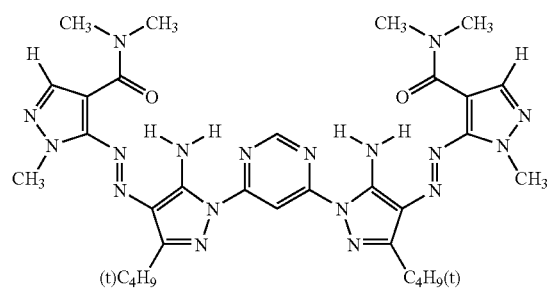
Pig.-27
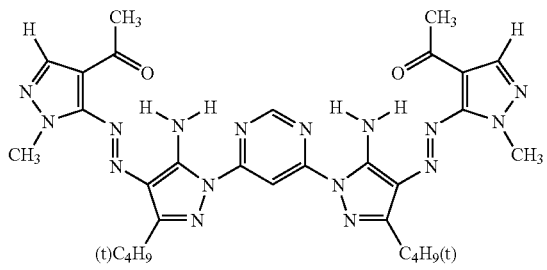
Pig.-28
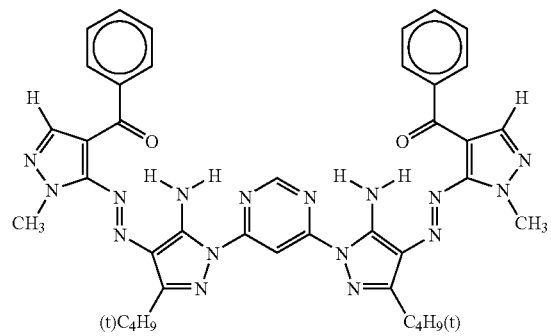
Pig.-29
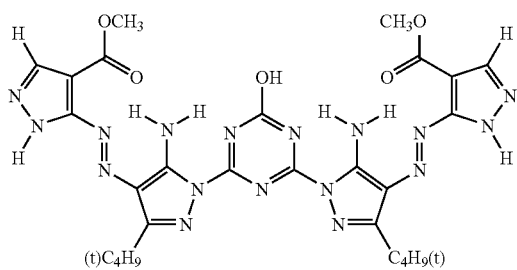
Pig.-30
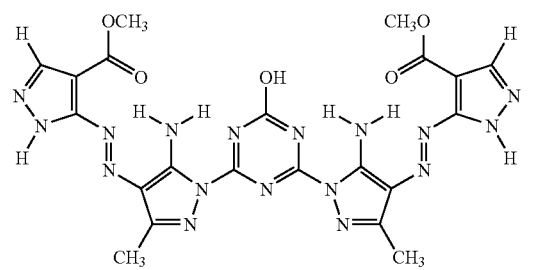
Pig.-31
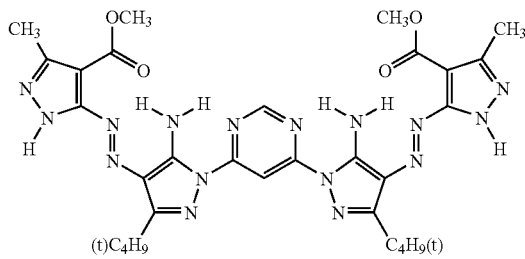
Pig.-32
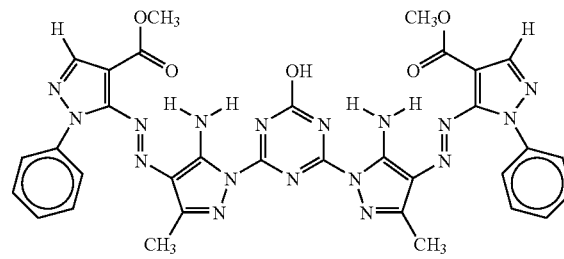
Pig.-33
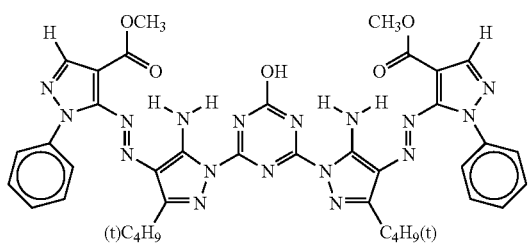
Pig.-34
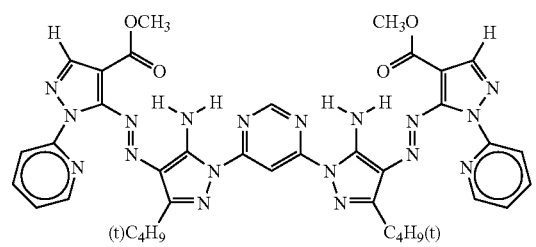
Pig.-35

-continued

-continued

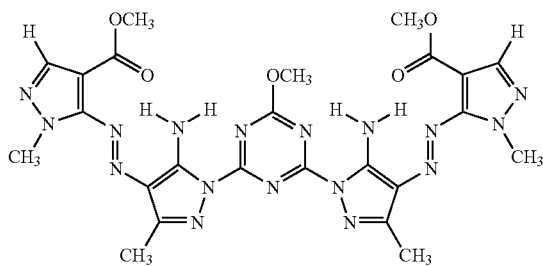
Pig.-43

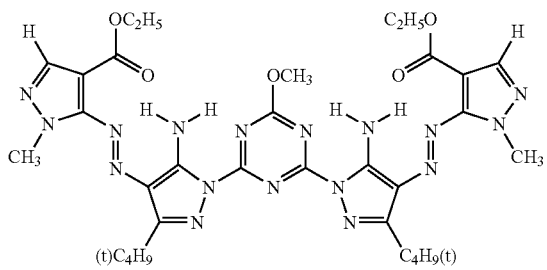
Pig.-44

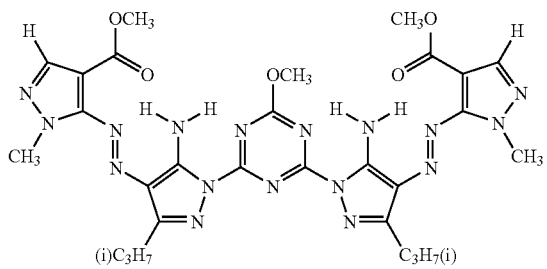
Pig.-45

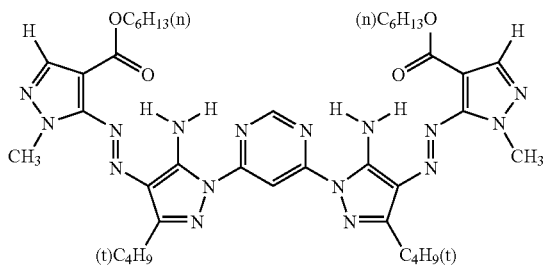
Pig.-46

There is no particular limitation to the azo compound represented by Formula (1) as long as its chemical structure is that of Formula (1) or that of any one of tautomers thereof. There is also no particular limitation to a crystalline form thereof. The pigment may have any crystalline form, and examples thereof include a so-called polymorph (crystalline polymorph).

The "crystalline polymorph" of one compound is a crystal which has the same composition as the compound, but the arrangement of building block (molecule or ion) in the crystal is different from that in the compound. Chemical and physical properties of the crystalline polymorph may be determined by its crystal structure. Prulal crystalline polymorphs may be distinguished from each other according to rheology, hue, and other color characteristics. Difference in prulal crystalline polymorphs may be confirmed by X-Ray Diffraction (powder X-ray diffraction measurement result) or X-Ray Analysis (X-ray crystal structure analysis result).

When the azo compound represented by Formula (1) in the invention has a crystalline polymorph, the crystal form may be that of any polymorphs thereof, and may be a mixture of two or more polymorphsm although it is preferable that the azo pigment has a single crystalline polymorph as a main component. That is, it is preferable that the azo pigment has smaller contamination with crystalline polymorph. The content of the azo pigment having a single crystal form is typically from 70% to 100%, preferably from 80% to 100%, more preferably from 90% to 100%, further preferably from 95% to 100%, and particularly preferably 100% based on the total amount of the azo pigment.

When the azo pigment contains, as a main component, a compound having a single crystal form, the regularity for the arrangement of pigment molecules may be improved and the intramolecular and intermolecular interactions may be enhanced. Thus, a high level three-dimensional network is easily formed. As a result, performances required for the pigment such as improvement in the hue, lightfastness, heat fastness, humidity fastness, oxidizing gas fastness, or solvent resistance may be improved.

The content of the crystalline polymorph based on a total amount of the azo pigment may be confirmed by the value of the solid which is physicochemically measured by Single crystal X-ray crystal structure analysis, Powder X diffraction (XRD), Micrograph (TEM) of crystal, or IR (KBr method).

In the invention, when the azo compound represented by Formula (1) has acid groups, a part or all of the acid groups may be in a form of salt, or a salt-form pigment and a free acid-form pigment may be present as a mixture. Examples of the form of salt include a salt of alkali metals such as Na, Li, or K; a salt of ammonium which may be substituted by an alkyl group or a hydroxyalkyl group; and a salt of organic amine. Examples of the organic amine include lower alkylamine, hydroxy-substituted lower alkylamine, carboxy-substituted lower alkylamine, and polyamine having from 2 to 10 alkyleneimine units, each of the units having from 2 to 4 carbon atoms. Either a pigment of a single salt-form or pigments of prulal salt-forms may be present in the azo pigment.

When a plurality of acid groups are included in one molecule of the azo pigment used in the invention, the plurality of acid groups may be independently a salt form or an acid form, and may be different from each other.

In the invention, the azo pigment a hydrate of the azo compound represented by Formula (1) and containing water molecules in the crystal. The number of water molecules in the crystal is not particularly limited.

Subsequently, an example of the production method of the azo compound represented by Formula (1) will be described. For example, a heterocyclic amine represented by Formula (A) described below is diazotized under acid condition, which is subjected to coupling reaction with the compound represented by the following Formula (B). The resulting product is subjected to post-treatment in a conventional manner to produce the azo compound represented by Formula (1).

Formula (A)

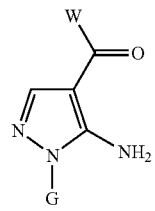

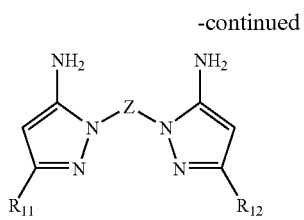
Formula (B)

In Formulae (A) and (B), W has the same definition as that of $W_1$ or $W_2$ in Formula (1); G has the same definition as that of $G_1$ or $G_2$ in Formula (1); and $R_{11}$, $R_{12}$ and Z respectively has the same definition as that of corresponding $R_{11}$, $R_{12}$ and Z.

The heterocyclic amine represented by Formula (A) may be generally produced by a well-known and common used method (for example, the method described in Helv. Chim. Acta, 41, 1958, 1052-1056, and the method described in Helv. Chim. Acta, 42, 1959, 349-352; the disclosures of which are incorporated by reference herein), or any method which substantially accords with any of these.

The compound represented by Formula (B) may be produced by the methods described in WO 06/082669 or JP-A No. 2006-57076, or any method which substantially accords with any of these.

The diazotizing reaction of the heterocyclic amine represented by Formula (A) may be performed by allowing the heterocyclic amine to react with reagents such as sodium nitrite, nitrosylsulfuric acid, and isoamyl nitrite in an acidic solvent such as sulfuric acid, phosphoric acid, acetic acid, hydrochloric acid, or methanesulfonic acid at a temperature of 15° C. or lower for about 10 minutes to about 6 hours.

The coupling reaction may be carried out by reacting the diazonium salt obtained by the above-described method with the compound represented by Formula (B) at 40° C. or lower, preferably at 25° C. or lower, for about 10 minutes to about 12 hours.

Generally, a crystal is obtained by adding water or an alcohol solvent to the reaction liquid to precipitate the crystal and then performing filtration, although the crystal may have been precipitated in the reaction liquid in some cases. Alternatively, such a crystal is obtained by adding the reaction liquid to an alcohol solvent or water to precipitate the crystal and then performing filtration. The thus obtained may be further washed and dried if necessary to obtain the azo compound represented by Formula (1).

The azo compound represented by Formula (1) is obtained as a crude azo pigment by the above production method. In preferable embodiments, such a elude azo pigment is subjected to post-treatment for being employed in the invention. Examples of the post-treatment include: pigment particle regulation by milling such as solvent salt milling, salt milling, dry milling, solvent milling, or acid pasting, and/or by heating a solvent; and surface treatment of pigment particles with resins, surfactants, and/or dispersing agents.

In preferable embodiments, the azo compound represented by Formula (1) subjected to post-treatment by solvent heating treatment and/or solvent salt milling is used in the invention.

Examples of the solvent to be used for the solvent heating treatment include water; aromatic hydrocarbon solvents such as toluene and xylene; halogenated hydrocarbon solvents such as chlorobenzene or o-dichlorobenzene; alcohol solvents such as i-propanol or i-butanol; polar aprotic organic solvents such as N,N-dimethylformamide, N,N-dimethylacetamide, or N-methyl-2-pyrrolidone; glacial acetic acid, pyridine, and mixtures thereof. Organic or inorganic acids or bases may be further added to the above-described solvents. The temperature of solvent heating treatment varies depending on the primary particle diameter of the desired pigment. In preferable embodiments, the temperature is from 40° C. to 150° C., and in more preferable embodiments, the temperature is from 60° C. to 100° C. The time for the treatment is preferably from 30 minutes to 24 hours.

Examples of the solvent salt milling include a method including placing, into a kneading machine, a crude azo pigment, an inorganic salt, and an organic solvent in which the organic salt is insoluble, and performing kneading and grinding. A water-soluble inorganic salt may be suitably used as the inorganic salt. Preferable examples thereof include inorganic salts such as sodium chloride, potassium chloride or sodium sulfate. In preferable embodiments, the inorganic salt has an average particle diameter of 0.5 µm to 50 µm. The amount of the inorganic salt is preferably from 3 parts by mass to 20 parts by mass, and more preferably from 5 parts by mass to 15 parts by mass with respect to the crude azo pigment. A water-soluble organic solvent may be suitably used as the organic solvent. Since the solvent may easily evaporate due to the temperature rise at the time of kneading, a high-boiling-point solvent is preferable from a viewpoint of safety.

Examples of the organic solvent include diethylene glycol, glycerol, ethylene glycol, propylene glycol, liquid polyethylene glycol, liquid polypropylene glycol, 2-(methoxymethoxy)ethanol, 2-butoxyethanol, 2-(isopentyloxy)ethanol, 2-(hexyloxy)ethanol, diethylene glycol monomethyl ether, diethylene glycol monoethyl ether, diethylene glycol monobutyl ether, triethylene glycol, triethylene glycol monomethyl ether, 1-methoxy-2-propanol, 1-ethoxy-2-propanol, dipropylene glycol, dipropylene glycol monomethyl ether, dipropylene glycol monomethyl ether, dipropylene glycol, and mixtures thereof. The amount of the water-soluble organic solvent is preferably from 0.1 to 5 times of an amount of the crude azo pigment. The kneading temperature is preferably from 20° C. to 130° C., and particularly preferably from 40° C. to 110° C. Examples of the kneading machine include kneaders and mix maulers.

Vinyl Polymer Particles

Preferable examples of the vinyl polymer particle (colored particle) used in the invention include a particle containing at least: a polymer; and an azo pigment, the polymer having at least (a) a hydrophobic structural unit derived from at least one selected from an acrylate having an aromatic ring that binds to a main chain of the acrylate via a linking group and a methacrylate having an aromatic ring that binds to a main chain of the methacrylate via a linking group, and (b) 5 mass % or more and 18 mass % or less of a hydrophilic structural unit derived from at least one of acrylic acid and methacrylic acid with respect to the total mass of the polymer, and the azo pigment being a compound represented by Formula (1), a tautomer of the compound, a salt of the azo compound, a salt of the tautomer, a hydrate of the compound, or a hydrate of the tautomer.

Herein, the "structural unit (of a polymer) derived from a specific monomer" herein means a unit that has a structure which can be typically incorporated into the polymer by employing the specific monomer as that to be polymerized for forming the polymer.

Preferable example of the vinyl polymer particle (colored particle) further include a particle containing at least: a styrene-acrylic acid copolymer; and an azo pigment, the azo pigment being a compound represented by Formula (1), a tautomer of the compound, a salt of the azo compound, a salt of the tautomer, a hydrate of the compound, or a hydrate of the tautomer.

Vinyl Copolymer Having Aromatic Ring that Binds to Main Chain Via Linking Group

The vinyl copolymer in the invention has a structure containing at least a hydrophobic structural unit (a) and a hydrophilic structural unit (b), and may further contain a structural unit different from the hydrophobic structural unit (a) and the hydrophilic structural unit (b) if necessary.

Hydrophobic Structural Unit (a)

The hydrophobic structural unit (a) is derived from at least one member selected from an acrylate having an aromatic ring bonded via a linking group to the main chain of the vinyl copolymer and a methacrylate having an aromatic ring bonded via a linking group to the main chain of the vinyl copolymer. The vinyl copolymer has a structure in which the aromatic ring is bonded via the linking group to an atom of the main chain of the vinyl copolymer. Namely, the aromatic ring is not directly bonded to the atom of the main chain, thereby maintaining a suitable distance between the hydrophobic aromatic ring and the hydrophilic structural unit acrylate or methacrylate. This configuration may enable to easily cause interaction between the polyvinyl polymer and the pigment to achieve strong adsorption, which may lead to further improvement in dispersibility of the vinyl polymer particle.

The content of the hydrophobic structural units (a) is preferably in a range of 10% by mass or more but less than 75% by mass, more preferably in a range of 20% by mass or more but less than 70% by mass, and particularly preferably in a range of 30% by mass or more but less than 60% by mass, with respect to total mass of the vinyl copolymer, from viewpoints of dispersion stability of the pigment, ejection stability, and detergency.

The (a) hydrophobic structural unit is preferably introduced, in the vinyl copolymer, in a form of a structural unit represented by the following Formula (II).

Formula (II)

In Formula (II), $R_1$ represents a hydrogen atom, a methyl group, or a halogen atom. $L_1$ represents *—COO—, *—OCO—, *—CONR$_2$—, *—O—, or a substituted or unsubstituted phenylene group, and $R_2$ represents a hydrogen atom or an alkyl group having from 1 to 10 carbon atoms. The asterisk (*) in the group represented by $L_1$ denotes a position of a bond linking to the main chain of the vinyl copolymer. The substituent of the phenylene group is not particularly limited, and examples thereof include a halogen atom, an alkyl group, an alkoxy group, a hydroxy group, and a cyano group.

$L_2$ represents a single bond or a divalent linking group having from 1 to 30 carbon atoms. When $L_2$ is a divalent linking group, it is preferably a linking group having from 1 to 25 carbon atoms, more preferably a linking group having from 1 to 20 carbon atoms, and even more preferably a linking group having from 1 to 15 carbon atoms.

Among them, particularly preferable examples include an alkyleneoxy group having from 1 to 25 (more preferably 1 to 10) carbon atoms, an imino group (—NH—), a sulfamoyl group, and divalent linking groups containing an alkylene group and/or alkylene oxy group, such as an alkylene group having from 1 to 20 (more preferably 1 to 15) carbon atoms or an ethylene oxide group [—(CH$_2$CH$_2$O)$_n$—, n (which means an average repeat number)=1 to 6], and combinations of two or more of these groups.

In Formula (II), Ar represents a monovalent group derived from an aromatic ring compound.

The aromatic ring compound from which monovalent group represented by Ar is derived is not particularly limited, and examples thereof include benzene, a condensed aromatic ring compound having eight or more carbon atoms, an aromatic ring compound condensed with a heterocycle, and a compound formed from two or more benzene rings linked to each other. Herein, the "group derived from a specific chemical structure" means a group that has a structure which can be formed by removing at least one atom from specific chemical structure.

The "condensed aromatic ring compound having eight or more carbon atoms" refers to: an aromatic ring compound having at least two benzene rings which are condensed; or an aromatic compound including at least one aromatic ring and an alicyclic hydrocarbon condensed with the aromatic ring, each of which having eight or more carbon atoms. Specific examples include naphthalene, anthracene, fluorene, phenanthrene, and acenaphthene.

The "aromatic ring compound condensed with a heterocycle" refers to a compound in which an aromatic compound (preferably a benzene ring) containing no heteroatom and a cyclic compound containing a heteroatom are condensed. The heteroatom-containing cyclic compound is preferably a five-membered or six-membered ring. The heteroatom is preferably a nitrogen atom, an oxygen atom, or a sulfur atom. The heteroatom-containing cyclic compound may contain plural heteroatoms. In this case, the heteroatoms may be the same or different from each other. Specific examples of the aromatic ring condensed with a heterocycle include phthalimide, acridone, carbazole, benzoxazole, and benzothiazole.

The "compound formed from two or more benzene rings linked to each other" refers to a compound in which two or more benzenes are bound with each other via a single bond(s), a divalent linking group(s) or a trivalent linking group(s). Preferable examples of the divalent linking group include an alkylene group having from 1 to 4 carbon atoms, —CO—, —O—, —SO$_2$—, and combinations of any of these. Examples of the trivalent linking group include a methine group. Each of the benzenes may be linked by prulal linking groups. The prulal linking groups may be either the same groups or different from each other. The number of the benzenes is preferably from 2 to 6, and more preferably from 2 to 3. Specific examples of the compound formed from two or more benzene rings linked to each other include biphenyl, triphenylmethane, diphenylmethane, and diphenysulfone.

Preferable examples of the structural unit represented by Formula (II) include those in which $R_1$ represents a hydrogen atom or a methyl group, $L_1$ represents *—COO—, and $L_2$ represents divalent linking groups containing an alkylene group and/or alkylene oxy group having from 1 to 25 carbon atoms, and more preferable thereof include those in which $R_1$ represents a hydrogen atom or a methyl group, $L_1$ represents *—COO—, and $L_2$ represents an ethylene oxide group [*—(CH$_2$CH$_2$O)$_n$—, in which n (an average repeat number) is from 1 to 6, and the asterisk (*) denotes a position of a bond at which this group is linked to the main chain].

Specific examples of the monomer for forming the hydrophobic structural unit (a) are shown below. However, the invention is not limited to the following specific examples.

| M-1 | M-2 |
|---|---|
| 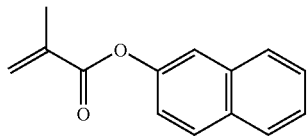 | 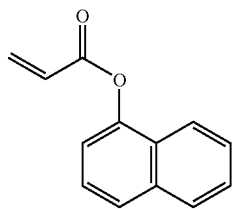 |
| M-3 | M-4 |
| 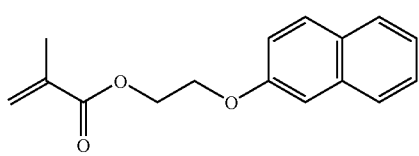 | 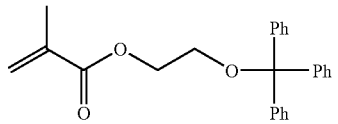 |
| M-5 | M-6 |
| 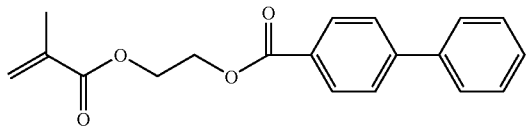 | 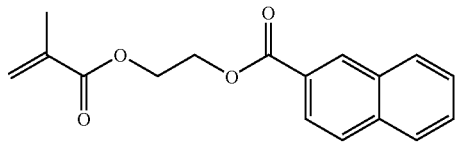 |
| M-7 | M-8 |
| 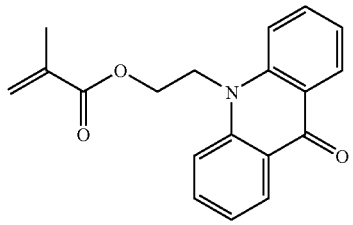 | 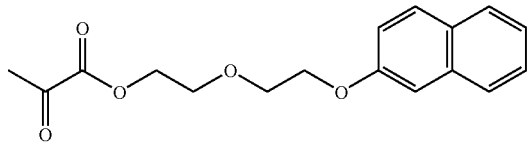 |
| M-9 | M-10 |
| 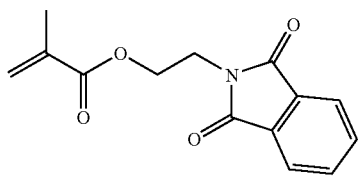 | 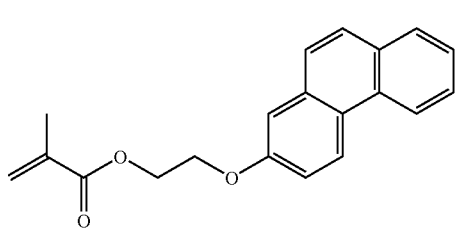 |
M-11
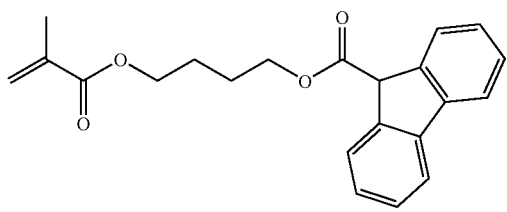
M-12
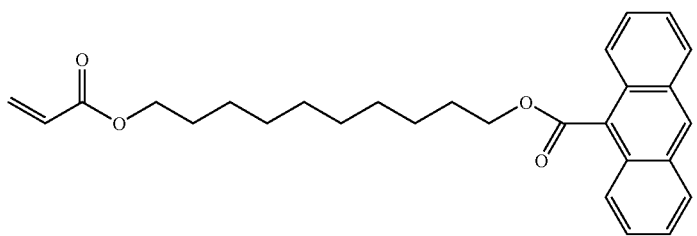

-continued
M-13
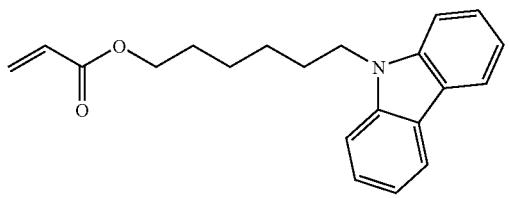
M-14
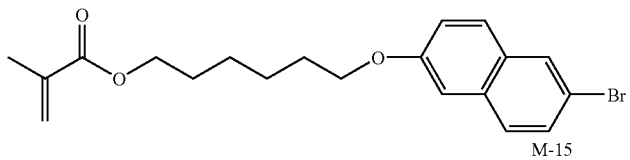
M-15
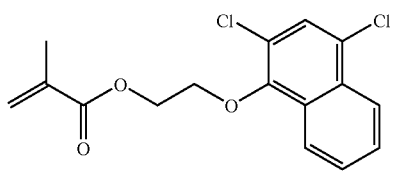
M-16
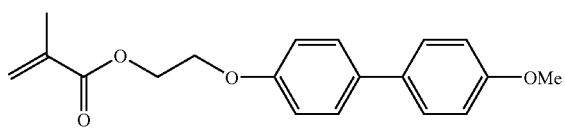
M-17
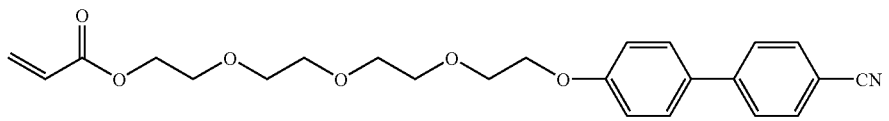
M-18
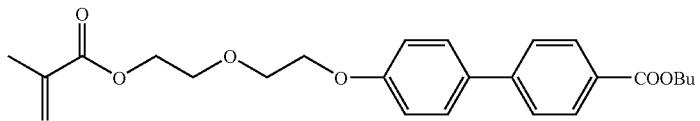
M-19
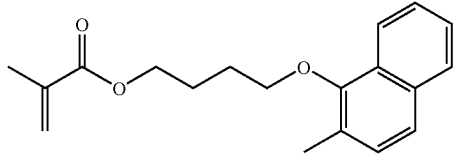
M-20
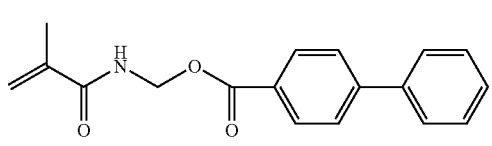
M-21
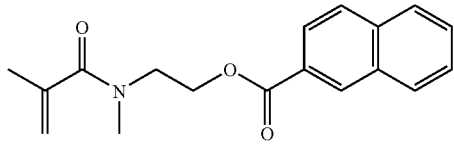
M-22
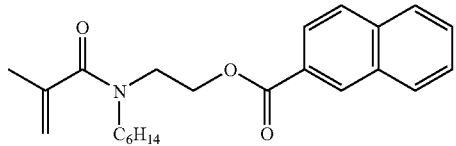
M-23
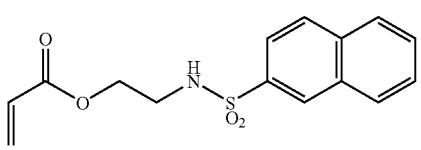
M-24
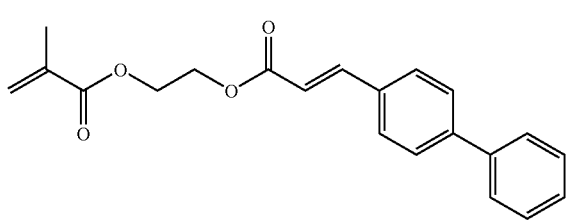

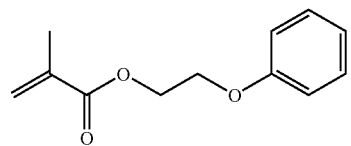

M-25

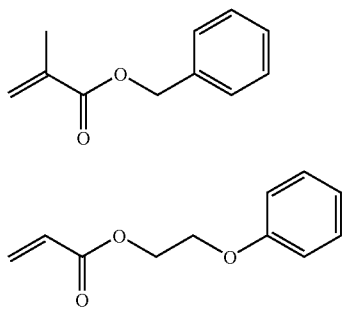

M-26

M-27

Among the specific examples of the hydrophobic structural unit (a) for forming the vinyl copolymer in the invention, structural units derived from any one of benzyl acrylate, benzyl methacrylate, phenoxyethyl acrylate and phenoxyethyl methacrylate are preferable from the viewpoint of dispersion stability.

Other Hydrophobic Structural Unit (a1)

The vinyl copolymer used in the invention may further have a hydrophobic structural unit (a1), which is a hydrophobic structural unit and which is not the hydrophobic structural unit (a). Examples of the hydrophobic structural unit (a1) include structural units derived from vinyl monomers such as (meth)acrylates, (meth)acrylamides, styrenes, or vinyl esters, which are not classified into the hydrophilic structural unit (b) (e.g., not having a hydrophilic functional group) described below. These structural units may be used alone or in a combination of two or more of them.

Preferable examples of the hydrophobic structural unit (a1) include an alkyl acrylate and alkyl methacrylate respectively having an alkyl moiety containing 1 to 18 carbon atoms. The alkyl moiety in these alkyl esters preferably has 1 to 8 carbon atoms, more preferably 1 to 4 carbon atoms, and further preferably 1 or 2 carbon atoms, from the viewpoint that the aromatic ring and the pigment when interacting with each other are not sterically adversely affected.

A content ratio of the hydrophobic structural units (a1) in the vinyl copolymer is preferably from 5% by mass to 70% by mass, and more preferably 20% by mass to 60% by mass with respect to total mass of the vinyl copolymer, from the viewpoint of enlarging interaction between the aromatic ring in the polymer and the pigments.

Examples of the (meth)acrylates include methyl(meth)acrylate, ethyl(meth)acrylate, iso-propyl(meth)acrylate, iso-butyl(meth)acrylate, t-butyl(meth)acrylate, cyclohexyl(meth)acrylate, dodecyl(meth)acrylate, and stearyl(meth)acrylate. Among them, methyl(meth)acrylate, ethyl(meth)acrylate and cyclohexyl(meth)acrylate are preferable as the (meth)acrylates Examples of the (meth)acrylamides include N-cyclohexyl(meth)acrylamide, N-2-methoxyethyl(meth)acrylamide, N,N-diallyl(meth)acrylamide, and N-allyl(meth)acrylamide.

Examples of the styrenes include styrene, methylstyrene, dimethylstyrene, trimethylstyrene, ethylstyrene, isopropylstyrene, n-butylstyrene, tert-butylstyrene, methoxystyrene, butoxystyrene, acetoxystyrene, chlorostyrene, dichlorostyrene, bromostyrene, chloromethylstyrene, methyl vinylbenzoate, α-methylstyrene, and vinylnaphthalene. Among them, styrene and α-methylstyrene are preferable.

Examples of the vinyl esters include vinyl acetate, vinyl chloroacetate, vinyl propionate, vinyl butyrate, vinyl methoxy acetate, and vinyl benzoate. Among them, vinyl acetate is preferable.

Hydrophilic Structural Unit (b)

The vinyl copolymer used in the invention contains at least a hydrophilic structural unit (b) derived from acrylic acid or methacrylic acid.

The content of the hydrophilic structural unit (b) is in a range of from 5% by mass to 18% by mass with respect to the total mass of the vinyl copolymer, from the viewpoints of the dispersion stability of the pigment, ejection stability, and detergency. When the content of the hydrophilic structural unit (b) is less than 5% by mass, dispersion stability may be deteriorated, and when the content is more than 18% by mass, the amount of the component dissolved in an aqueous medium by itself may be increased, so that various properties such as pigment dispersibility may be deteriorated and the ability of ink to be ejected in inkjet recording may be deteriorated.

The content of the hydrophilic structural unit (b) is particularly preferably in a range of from 7% by mass to 15% by mass with respect to the total mass of the vinyl copolymer.

Other Hydrophilic Structural Unit (b1)

The vinyl copolymer may contain, in addition to the structural unit (b) derived from acrylic acid or a structural unit derived from methacrylic acid, a hydrophilic structural unit (b1), which is derived from a nonionic hydrophilic group-containing monomer and which is not the hydrophilic structural unit (b1). Examples of the structural unit derived from a nonionic hydrophilic group-containing monomer include hydrophilic functional group-containing vinyl monomers such as (meth)acrylates, (meth)acrylamides or vinyl esters, each of which having hydrophilic functional group.

Examples of the "hydrophilic functional group" include a hydroxy group, an amino group, an amido group (having an unsubstituted nitrogen atom), and alkylene oxides such as polyethylene oxide or polypropylene oxide.

Preferable examples of the hydrophilic structural unit containing a nonionic hydrophilic group include a hydrophilic structural unit having a hydroxy group. A number of the hydroxy group in the hydrophilic structural unit is not particularly limited. The number of the hydroxy group in the hydrophilic structural unit may be preferably from 1 to 4, more preferably from 1 to 3, and particularly preferably 1 or 2, from the viewpoints of hydrophilicity of the vinyl copolymer and compatibility with solvent(s) or other monomer(s) employed in polymerization for forming the vinyl copolymer.

Preferable examples of the hydrophilic structural unit containing a nonionic hydrophilic group include a hydrophilic structural unit having an alkylene oxide structure. From the viewpoint of hydrophilicity, the alkylene moiety in the alkylene oxide structure preferably has 1 to 6 carbon atoms, more preferably has 2 to 6 carbon atoms, and particularly preferably has 2 to 4 carbon atoms. The degree of polymerization of the alkylene oxide structure is preferably from 1 to 120, more preferably from 1 to 60, and particularly preferably from 1 to 30.

The monomer for forming the hydrophilic structural unit containing a nonionic hydrophilic group is not particularly limited as long as it contains a functional group for forming a polymer, such as an ethylenically unsaturated bond, and a nonionic hydrophilic functional group. The monomer may be selected from known monomers. Specific examples of preferable monomers may include hydroxyethyl(meth)acrylate, hydroxybutyl(meth)acrylate, (meth)acrylamide, aminoethyl acrylate, aminopropyl acrylate, and (meth)acrylates containing an alkylene oxide polymer.

The hydrophilic structural unit containing a nonionic hydrophilic group may be incorporated into the vinyl copolymer by forming a polymer chain of the vinyl copolymer by polymerizing monomers corresponding to the hydrophilic structural unit. Alternatively, the hydrophilic structural unit containing a nonionic group may be provided in the vinyl copolymer by introducing a hydrophilic functional group into a polymer chain of the vinyl copolymer which has been formed by polymerization.

The content of the hydrophilic structural unit (b) may be different depending on, for example, a ratio of the hydrophobic structural unit (a). For example, when the vinyl copolymer is configured only of the unit derived from acrylic acid or methacrylic acid (hydrophilic structural unit (b)) and the hydrophobic structural unit (a), the content of the unit derived from acrylic acid or methacrylic acid is obtained according to: [100−{(a) repeating unit represented by Formula (1)}(%)] in terms of percent by mass.

The hydrophilic structural unit (b) may be used singly or in a combination of two or more thereof.

The acid value of the vinyl copolymer is preferably in the range of from 50 mgKOH/g to 250 mgKOH/g, and more preferably in the range of from 60 mgKOH/g to 150 mgKOH/g from the viewpoints of pigment dispersibility and storage stability.

The acid value is defined as the mass (mg) of KOH necessary for completely neutralizing 1 g of the vinyl copolymer, and measured by the method described in Japanese Industrial Standard (JIS K0070, 1992), the disclosure of which is incorporated by reference herein.

The weight average molecular weight (Mw) of the vinyl copolymer employed in the invention is preferably from 10000 to 150000, more preferably from 20000 to 50000, and further preferably from 30000 to 40000. If the molecular weight is within such range, the vinyl copolymer may provide a good steric repulsion effect as a dispersant, and is readily adsorbed on the pigment owing to the steric effect.

The molecular weight distribution of the vinyl copolymer employed in the invention (weight average molecular weight/number average molecular weight) is preferably from 1 to 6, and more preferably from 1 to 4. When the molecular weight distribution is within the above-described range, the resultant ink may have improved dispersion stability and jetting stability.

The number average molecular weight and the weight average molecular weight are measured by the differential refractometer detection with THF as a solvent in a GPC analyzer using columns TSKGEL SUPER HZM-H, TSKGEL SUPER HZ4000, and TSKGEL SUPER HZ2000 (all trade names, manufactured by Tosoh Corporation), and is obtained by conversion with a polystyrene reference material.

Styrene-Acrylic Acid Copolymer

The styrene-acrylic acid copolymer which can be preferably used in the invention includes a structural unit derived from a styrene monomer and at least one of a structural unit derived from acrylic acid and a structural unit derived from methacrylic acid.

In the invention, the total amount of the styrene monomer, acrylic acid, and methacrylic acid to form the styrene-acrylic acid copolymer is 45% by mass or more, preferably 50% by mass or more, and further preferably in the range of from 60% by mass to 90% by mass, with respect to the total amount of all monomers for forming the styrene-acrylic acid copolymer.

The amount of the styrene monomer is preferably 50% by mass or more, and more preferably in the range of from 60% by mass to 90% by mass, with respect to the total amount of all monomers for forming the styrene-acrylic acid copolymer.

Known compounds may be used as the styrene monomer for forming the styrene-acrylic acid copolymer to be used in the invention. Examples thereof include an alkylstyrene monomer such as styrene, α-methylstyrene, β-methylstyrene, dimethylstyrene, trimethylstyrene, ethylstyrene, i-propylstyrene, n-butylstyrene, or tert-butylstyrene; methoxystyrene, butoxystyrene, acetoxystyrene, chlorostyrene, dichlorostyrene, bromostyrene, chloromethylstyrene, methyl vinylbenzoate, α-methylstyrene, and vinylnaphthalene.

Among these styrene monomers, an alkylstyrene monomer is preferably used, and a styrene monomer is particularly preferably used.

The styrene-acrylic acid copolymer used in the invention may include a structural unit derived from other monomers which may be copolymerized with monomers such as the styrene monomer, acrylic acid, and methacrylic acid, if necessary.

Examples of the other monomer include (meth)acrylic acid esters such as methyl(meth)acrylate, ethyl(meth)acrylate, n-propyl(meth)acrylate, i-propyl(meth)acrylate, n-butyl(meth)acrylate, s-butyl(meth)acrylate, t-butyl(meth)acrylate, pentyl(meth)acrylate, hexyl(meth)acrylate, cyclohexyl(meth)acrylate, 2-ethylhexyl(meth)acrylate, heptyl(meth)acrylate, octyl(meth)acrylate, nonyl(meth)acrylate, 2-ethoxyethyl acrylate, 3-ethoxypropyl acrylate, 2-ethoxybutyl acrylate, 3-ethoxybutyl acrylate, dimethylaminoethyl (meth)acrylate, hydroxyethyl(meth)acrylate, hydroxypropyl (meth)acrylate, hydroxybutyl(meth)acrylate, ethyl α-(hydroxymethyl)acrylate, methyl α-(hydroxymethyl)acrylate, phenyl(meth)acrylate, benzyl(meth)acrylate, phenylethyl(meth)acrylate or phenoxyethyl(meth)acrylate; mono (meth)acrylic acid esters of polyhydric alcohols or polyhydric phenols such as diethylene glycol, triethylene glycol, polyethylene glycol, glycerin or bisphenol A; dialkyl maleates such as dimethyl maleate or diethyl maleate; (meth)acrylamides such as N-cyclohexyl(meth)acrylamide, N-2-(methoxyethyl) (meth)acrylamide, N,N-diallyl(meth)acrylamide or N-allyl(meth)acrylamide; and vinyl esters such as vinyl acetate, vinyl chloroacetate, vinyl propionate, vinyl butyrate, vinyl methoxyacetate or vinyl benzoate.

In embodiments, the other monomer may preferably include (meth)acrylic acid esters, more preferably include (meth)acrylic acid alkyl esters, and further preferably include (meth)acrylic acid esters having an alkyl group having from 1 to 4 carbon atoms from the viewpoint of dispersion stability.

Herein, the scope of the "(meth)acrylic ester" includes both acrylic acid ester and methacrylic acid ester.

One or a plurality of the other monomer(s) may be used as a monomer component(s) to form the styrene-acrylic acid copolymer.

Hereinafter, specific examples of the monomers and content ratio thereof used for forming the styrene-acrylic acid copolymer will be described, but the invention is not limited thereto. The content ratios are values expressed in terms of weight of the respective monomer to be used for forming the styrene-acrylic acid copolymer.

Styrene:acrylic acid:methacrylic acid:methyl methacrylate=25:10:10:55

Styrene:acrylic acid:methacrylic acid:methyl methacrylate=40:10:10:40

Styrene:acrylic acid:methacrylic acid:methyl methacrylate=55:18:18:9

Styrene:acrylic acid:methacrylic acid:methyl methacrylate=70:10:10:10

Styrene:acrylic acid:methacrylic acid:methyl methacrylate=55:4:3:38

Styrene:acrylic acid:methacrylic acid=80:10:10

Styrene:acrylic acid:methacrylic acid=90:5:5

Styrene:acrylic acid:methacrylic acid:benzyl methacrylate=55:5:5:35

Styrene:acrylic acid:methacrylic acid:cyclohexyl methacrylate=55:5:5:35

The acid value of the styrene-acrylic acid copolymer used in the invention is preferably in a range of from 50 mgKOH/g/g to 250 mgKOH/g/g, and more preferably in a range of 60 mgKOH/g/g or more and less than 150 mgKOH/g/g. from the viewpoints of pigment dispersibility and storage stability.

The acid value is defined as the mass (mg) of KOH necessary for completely neutralizing 1 g of the styrene-acrylic acid copolymer, and measured by the method described in Japanese Industrial Standard (JIS K0070, 1992), the disclosure of which is incorporated by reference herein.

The weight average molecular weight (Mw) of the styrene-acrylic acid copolymer is preferably from 10,000 to 150,000, more preferably from 20,000 to 50,000, and further preferably from 30,000 to 40,000.

When the molecular weight is within such range, the styrene-acrylic acid copolymer may provide a good steric repulsion effect as a dispersant and tendency to reduce the time required for the adsorption to the pigment due to the steric effect.

The molecular weight distribution (represented by weight average molecular weight value/number average molecular weight value) of the styrene-acrylic acid copolymer to be used in the invention is preferably from 1 to 6, and more preferably from 1 to 4.

The molecular weight distribution may be preferably within such range from the viewpoints of dispersion stability of ink and ejection stability.

In preferable embodiments, 25% by mass or more of the styrene-acrylic acid copolymer is formed from the structural unit derived from the styrene monomer, the sum of the contents of the structural units derived from a styrene monomer, acrylic acid, or methacrylic acid is 45% by mass or more based on the total amount of the styrene-acrylic acid copolymer, the styrene-acrylic acid copolymer further contains a structural unit(s) derived from an acrylic ester(s) as the other monomer(s), and the weight average molecular weight of the styrene-acrylic acid copolymer is from 10,000 to 150,000.

In more preferable embodiments, 40% by mass to 70% by mass of the styrene-acrylic acid copolymer is formed from the structural unit derived from the styrene monomer, the sum of the contents of the structural units derived from a styrene monomer, acrylic acid, or methacrylic acid is in a range of from 50% by mass to 80% by mass based on the total amount of the styrene-acrylic acid copolymer, the styrene-acrylic acid copolymer further contains a structural unit(s) derived from an acrylic alkyl ester(s) as the other monomer(s), and the weight average molecular weight of the styrene-acrylic acid copolymer is from 20,000 to 50,000.

The vinyl polymer particle used in the invention contains, as its vinyl polymer, either the vinyl copolymer having a structure in which the aromatic ring is bonded via the linking group to an atom of the main chain of the vinyl copolymer, or the styrene-acrylic acid copolymer. The vinyl polymer may be either a random copolymer in which respective structural units are randomly introduced or may be a block copolymer in which respective structural units are regularly introduced. In the case that the vinyl polymer is the block copolymer, respective blocks formed of the structural units may be arranged in any order, and two or more blocks may have the same structure in the vinyl polymer.

It is preferable that the vinyl polymer employed in the invention is a random copolymer from the viewpoints of wide range of applicability and manufacturability.

The weight average molecular weight (Mw) of the vinyl polymer is preferably from 10,000 to 150,000, more preferably from 20,000 to 100,000, and further preferably from 30,000 to 80,000.

When the weight average molecular weight is within such range, the vinyl polymer may provide a good steric repulsion effect as a dispersant and tendency to reduce the time required for the adsorption to the pigment due to the steric effect.

Further, the molecular weight distribution (represented by weight average molecular weight value/number average molecular weight value) of the vinyl polymer to be used in the invention is preferably from 1 to 6, and more preferably from 1 to 4. The molecular weight distribution of the vinyl polymer may be preferably within such range from the viewpoints of dispersion stability of ink and ejection stability.

The vinyl copolymer and the styrene-acrylic acid copolymer which may be used in the invention may be synthesized by various polymerization methods such as solution polymerization, precipitation polymerization, suspension polymerization, bulk polymerization, or emulsion polymerization. Reactions for the polymerization may be performed by known operations such as batch system, semi-continuous system, or continuous system.

Examples of the method for initiating the polymerization include a method using a radical initiator and a method using application of light or radiation. The polymerization methods and the methods for initiating polymerization are described in, for example, "Macromolecular Synthesis Method, Teiji Tsuruta, Revised Edition, THE NIKKAN KOGYO SHIMBUN, Ltd., (1971)" and "Experimental Technique For Macromolecular Synthesis, co-authored by Takayuki Otsu and Masayoshi Kinoshita, pages 124 to 154, Kagaku-dojin Publishing Company, Inc, (1972)".

Among the above polymerization methods, a solution polymerization method using a radical initiator is particularly preferable. Example of a solvent to be used in the solution polymerization method include various organic solvents such as ethyl acetate, butyl acetate, acetone, methyl ethyl ketone, methyl i-butyl ketone, cyclohexanone, tetrahydrofuran, dioxane, N,N-dimethylformamide, N,N-dimethylacetamide, benzene, toluene, acetonitrile, methylene chloride, chloroform, dichloroethane, methanol, ethanol, 1-propanol, 2-propanol, or 1-butanol. There solvents may be used singly, or in a mixture of two or more of them. Alternatively, these solvents may be used by being mixed with water.

The polymerization temperature is set with taking the molecular weight of the polymer to be produced and the kinds of initiators into consideration. Usually, it is from about 0° C. to about 100° C. It is preferable that the polymerization is performed at from 50° C. to 100° C.

The reaction pressure may be selected appropriately. Usually, it is from 1 kgf/cm$^2$ to f/cm$^2$ to about 30 kgf/cm$^2$. The reaction time is about 5 hours to about 30 hours. The obtained resin may be subjected to purification such as reprecipitation.

The content of the vinyl copolymer or the styrene-acrylic acid copolymer is from 10% by mass to 90% by mass, more preferably from 20% by mass to 60% by mass, based on the total amount of the azo pigment contained in the water-based ink of the invention.

In embodiments, the vinyl polymer particles in the invention may be obtained as a dispersion of colored particles by dispersing, using a dispersing machine, a mixture which contains at least: the azo compound represented by Formula (1) as a colorant; either the vinyl polymer copolymer having an aromatic ring that binds to the main chain via a linking group or the styrene-acrylic acid copolymer (hereinafter sometimes referred to as a "polymer pigment-dispersing agent"), and may further contain a solvent (preferably a solvent containing an organic solvent) and the like if necessary.

It preferable embodiments, the production method of the vinyl polymer particles in the invention includes: mixing-hydrating in which a solution having water as a main component and containing the azo pigment, the polymer pigment-dispersing agent, an organic solvent for dissolving or dispersing the polymer pigment-dispersing agent, and a basic material is mixed; and solvent-removing in which at least a part of the organic solvent is removed.

According to this method of production of vinyl polymer particles, a dispersion of colored particles in which the vinyl polymer particles are finely dispersed and which has excellent storage stability may be produced.

Surfactant

The water-based inkjet recording ink of the invention preferably contains a surfactant. The surfactant is used as a surface tension regulator. Examples of the surfactant include nonionic surfactants, cationic surfactants, anionic surfactants, and betaine surfactants. In view of achieving good inkjetting, the surfactant is preferably used in an amount such that the water-based inkjet recording ink has a surface tension measured at 20° C. becomes 20 mN/m to 60 mN/m. Further, the surfactant is preferably used in an amount such that the surface tension is from 20 mN/m to 45 mN/m, and more preferably the surface tension is from 25 mN/m to 40 mN/m.

Specific examples of the nonionic surfactants include 2,4,7,9-tetramethyl-5-decyne-4,7-diol, 3,6-dimethyl-4-octine-3,6-diol, an alkyleneoxide adduct of 2,4,7,9-tetramethyl-5-decyne-4,7-diol, an alkyleneoxide adduct of 3,6-dimethyl-4-octine-3,6-diol, polyoxyethylene lauryl ether, polyoxyethylene octylphenyl ether, polyoxyethylene oleylphenyl ether, polyoxyethylene nonyiphenyl ether, oxyethylene-oxypropylene block copolymer, t-octylphenoxyethyl polyethoxyethanol, and nonylphenoxyethyl polyethoxyethanol. These nonionic surfactants may be used alone or in a combination of two or more of them.

Specific examples of the anionic surfactants include sodium dodecylbenzene sulfonate, sodium lauryl sulfate, sodium alkyl diphenyl ether disulfonate, sodium alkyl naphthalene sulfonate, sodium dialkyl sulfosuccinate, sodium stearate, potassium oleate, sodium dioctyl sulfosuccinate, sodium polyoxyethylene alkyl ether sulfate, sodium polyoxyethylene alkyl phenyl ether sulfate, sodium dialkyl sulfosuccinate, sodium stearate, sodium oleate, and sodium t-octylphenoxy ethoxypolyethoxyethyl sulfate. These anionic surfactants may be used alone or in combination of two or more of them.

Examples of the cationic surfactants include tetraalkyl ammonium salts, alkylamine salts, benzalkonium salts, alkylpyridium salts, and imidazolium salts, and specific examples thereof include dihydroxyethylstearylamine, 2-heptadecenyl-hydroxyethylimidazoline, lauryldimethylbenzylammonium chloride, cetylpyridinium chloride, and stearamidomethylpyridinium chloride. These cationic surfactants may be used alone or in combination of two or more of them.

The content of the surfactant in the water-based inkjet recording ink of the invention is not particularly limited, and is preferably 0.05% by mass to 2% by mass, and is more preferably from 0.1% by mass to 1% by mass based on the total amount of the water-based inkjet recording ink.

The water-based ink for inkjet recording of the invention contains at least one surfactant selected from the group consisting of 2,4,7,9-tetramethyl-5-decyne-4,7-diol, 3,6-dimethyl-4-octine-3,6-diol, an alkyleneoxide adduct of 2,4,7,9-tetramethyl-5-decyne-4,7-diol, and an alkyleneoxide adduct of 3,6-dimethyl-4-octine-3,6-diol, at a content of preferably 0.05 mass % to 2 mass %, more preferably 0.1 mass % to 1 mass %, based on the total amount of the water-based ink. When the content is 0.05 mass % or more, decrease in ejection accuracy may be suppressed. When the content is 2 mass % or less, decrease in the dispersion stability of the ink may be suppressed.

Commercial products may be used for the 2,4,7,9-tetramethyl-5-decyne-4,7-diol, 3,6-dimethyl-4-octyne-3,6-diol, an alkyleneoxide adduct of 2,4,7,9-tetramethyl-5-decyne-4,7-diol, and an alkylene oxide adduct of 3,6-dimethyl-4-octyne-3,6-diol. Examples thereof include SURFINOL 104, SURFINOL 82, SURFINOL 2502, SURFINOL 420, SURFINOL 440, SURFINOL 465 and SURFINOL 485 (all trade names, manufactured by Nissin Chemical Co., Ltd.), and ACETYLENOL E00, ACETYLENOL E40 and ACETYLENOL E100 (both trade names, manufactured by Kawaken Fine Chemicals Co., Ltd.).

Other Components

The water-based inkjet recording ink in the invention may contain, in addition to the above-described components, other components. Examples of the other components include a ultraviolet absorber, an anti-fading agent, a fungicide, a pH controlling agent, a rust preventive agent, an antioxidant, an emulsification stabilizer, a preservative, an anti-foaming agent, a viscosity regulator, a dispersion stabilizer, and a chelating agent.

Examples of the ultraviolet absorber include benzophenone ultraviolet absorbers, benzotriazole ultraviolet absorbers, salicylate ultraviolet absorbers, cyanoacrylate ultraviolet absorbers, and nickel complex salt ultraviolet absorbers.

The anti-fading agent may be selected from various organic anti-fading agents and metal complex anti-fading agents. Examples of the organic anti-fading agents include hydroquinones, alkoxy phenols, dialkoxy phenols, phenols, anilines, amines, indans, chromanes, alkoxy anilines, and heterocycles. Examples of the metal complexes include nickel complexes and zinc complexes.

Examples of the fungicide include sodium dehydroacetate, sodium benzoate, sodium pyridinethiol-1-oxide, p-hydroxybenzoic acid ethyl ester, 1,2-benzisothiazolin-3-one, sodium sorbate, and sodium pentachlorophenolate. The content of the fungicide in ink is preferably from 0.02% by mass to 1.00% by mass.

The pH controlling agent is not specifically limited as long as it does not have an adverse effect on ink to be produced and can adjust the pH to a desired value. It can be appropriately selected according to the purpose of use.

Examples of the pH controlling agent include alcohol amines (for example, diethanolamine, triethanolamine, 2-amino-2-ethyl-1,3-propanediol and the like), hydroxides of an alkali metal (for example, lithium hydroxide, sodium hydroxide, potassium hydroxide and the like), ammonium hydroxides (for example, ammonium hydroxide and quaternary ammonium hydroxide), phosphonium hydroxides, and alkali metal carbonates.

Examples of the rust preventive agent include acidic sulfites, sodium thiosulfate, ammonium thioglycolate, diisopropyl-ammonium nitrite, pentaerythritol tetranitrate, and dicyclohexylammonium nitrite.

Examples of the antioxidant include phenol antioxidants (including hindered phenol antioxidants), amine antioxidants, sulfur containing antioxidants, and phosphorus containing antioxidants.

Examples of the chelating agent include sodium ethylenediamine tetraacetate, sodium nitrilotriacetate, sodium hydroxyethyl-ethylenediamine triacetate, sodium diethylenetriamine pentaacetate, and sodium uramildiacetate.

Resin Particles

The water-based inkjet recording ink of the invention may contain resin particles or a polymer latex. Examples of the resins contained in the resin particles and the polymer latex include acrylic resins, vinyl acetate resins, styrene-butadiene resins, vinyl chloride resins, acryl-styrene resins, butadiene resins, styrenic resins, crosslinked acrylic resins, crosslinked styrenic resins, benzoguanamine resins, phenolic resins, silicone resins, epoxy resins, urethane resins, paraffin resins, and fluorine resins. Among the above resins, acrylic resins, acryl-styrene resins, styrenic resins, crosslinked acrylic resins, and crosslinked styrenic resins are preferable.

In preferable embodiments, the resin particles are self-dispersible polymer particles. The self-dispersible polymer particles refer to water-insoluble polymer particles which do not contain a free emulsifier and are made of a water-insoluble polymer that can, in the absence of a surfactant, be in a dispersed state in an aqueous medium by functional groups (particularly acidic groups or salts thereof) possessed by the polymer itself. As used herein, the "dispersed state" includes both an emulsified state (emulsion) in which the water-insoluble polymer which is in a liquid state is dispersed in an aqueous medium and a dispersed state (suspension) in which the water-insoluble polymer which is in a solid state is dispersed in an aqueous medium.

The water-insoluble polymer in the invention is preferably a water-insoluble polymer which is in a solid state and can be in a dispersed state in an aqueous medium.

Printability-Improving Liquid Composition

Examples of an inkjet recording method using the water-based inkjet recording ink of the invention include an inkjet recording method including a process of applying a printability-improving liquid composition onto a recording medium.

Preferable examples of the printability-improving liquid composition include a liquid composition which contains a component to form aggregates when being contacted with the water-based ink.

Examples of the aggregate-forming component include a multivalent metal salt, an organic acid, polyallylamine, and a derivative thereof. Herein, a "derivative" of a specific compound means a compound obtained by substituting, for an atom or an atomic group which is a partial structure of the specific compound, another atom or another atomic group.

Examples of the polyvalent metal salt include a metal salt of any of the following: a salt of an alkaline earth metal belonging to Group 2 of the Periodic Table (for example, magnesium or calcium), a salt of a transition metal belonging to Group 3 of the Periodic Table (for example, lanthanum), a salt of a cation derived from an element belonging to Group 13 of the Periodic Table (for example aluminum), or a salt a lanthanide (for example neodymium). Preferable examples of the metal salt include a carboxylate (for example, a formate, an acetate, or a benzoate), a nitrate, a chloride, or a thiocyanate. Among them, more preferable examples include a calcium salt or magnesium salt of a carboxylic acid (such as formic acid, acetic acid, or benzoic acid), a calcium salt or a magnesium salt of nitric acid, calcium chloride, magnesium chloride, and a calcium salt or a magnesium salt of thiocyanic acid.

Preferable examples of the organic acid include polyacrylic acid, acetic acid, glycolic acid, malonic acid, malic acid, maleic acid, ascorbic acid, succinic acid, glutaric acid, fumaric acid, citric acid, tartaric acid, lactic acid, sulfonic acid, orthophosphoric acid, pyrrolidonecarboxylic acid, pyronecarboxylic acid, pyrrolecarboxylic acid, furancarboxylic acid, pyridinecarboxylic acid, coumalic acid, thiophenecarboxylic acid, nicotinic acid, derivatives thereof, and salts thereof.

The component that causes aggregation of the pigment may be used singly or in combination of two or more thereof.

The content of the aggregate-forming component in the printability-improving liquid is preferably from 1% by mass to 10% by mass, more preferably from 1.5% by mass to 7% by mass, and still more preferably from 2% by mass to 6% by mass.

Preferable examples of the printability-improving liquid composition that can be used in the invention is one which forms aggregates by changing the pH of the water-based ink. The pH of this liquid composition is preferably from 1 to 6, more preferably from 2 to 5, and still more preferably from 3 to 5.

Physical Properties of Ink

The surface tension of the ink of the invention at 20° C. is preferably from 20 mN/m to 60 mN/m, more preferably from 20 mN/m to 45 mN/m, and still more preferably from 25 mN/m to 40 mN/m.

The viscosity of the ink of the invention at 20° C. is preferably from 1.2 mPa·s to 15.0 mPa·s, more preferably from 2 mPa·s to less than 13 mPa·s, and still more preferably from 2.5 mPa·s to less than 10 mPa·s.

The viscosity of the ink composition may be measured with, for example, a Brookfield viscometer.

Inkjet Recording Method

Preferable examples of an inkjet recording method employed with the water-based ink of the invention include a method in which energy is supplied to the water-based ink to form an image on a known image receiving material such as plain paper, resin coated paper, inkjet paper as those described in JP-A Nos. 8-169172, 8-27693, 2-276670, 7-276789, 9-323475, 62-238783, 10-153989, 10-217473, 10-235995, 10-337947, or 10-217597, a film, electrophotographic common paper, fabrics, glass, metal or ceramics. In addition, as an inkjet recording method employed with the water-based ink of the invention, the inkjet recording method described in the paragraphs [0093] to [0105] of JP-A No. 2003-306623 can be preferable.

When forming an image, a polymer latex compound may be used together for the purpose of imparting glossiness and water resistance or of improving weather-resistance of the image. The time when the latex compound is added to the image receiving material may be before, after, or simultaneously with application of a colorant. Accordingly, the latex compound may be added to an image receiving paper or added to an ink, or may be used as an independent liquid of the polymer latex. More specifically, methods described in JP-A Nos. 2002-166638, 2002-121440, 2002-154201, 2002-144696 and 2002-080759 can be preferably used.

Preferable examples of an image forming method using the water-based ink of the invention include an inkjet recording method including the following processes of:

a first process, being a process of applying a printability-improving liquid composition onto a recording medium;

a second process, being a process of applying an inkjet recording liquid onto the recording medium onto which the liquid composition has been applied; and other additional processes, which are not particularly limited, and may be suitably selected according to the purpose.

Examples of the additional processes include a drying/removal process and a heat fixing process. The drying/removal process is not specifically restricted as long as the ink solvent in the water-based ink that is applied to a recording medium can be dried and removed by the process, and conditions of the process may be suitably selected according to the purpose. The heat fixing process is not specifically restricted as long as resin particles contained in the water-based ink used in the inkjet recording method are fused and fixed in the process, and conditions of the process may be suitably selected according to the purpose.

EXAMPLES

Hereinafter, the invention will be described in more detail with reference to examples, but the invention is not limited to the examples. Further, "parts" and "%" are expressed in terms of mass, unless otherwise specified.

Synthesis Example 1

Synthesis of Exemplary Compound (Pig.-1)

The synthetic scheme of the Exemplary compound (Pig.-1) is shown below.

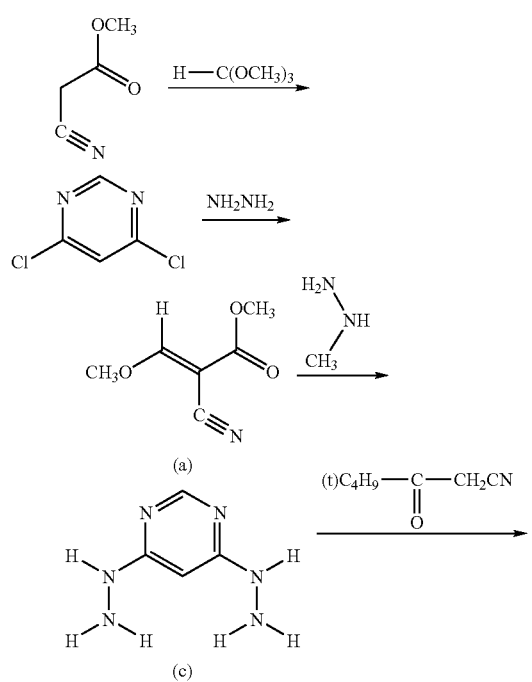

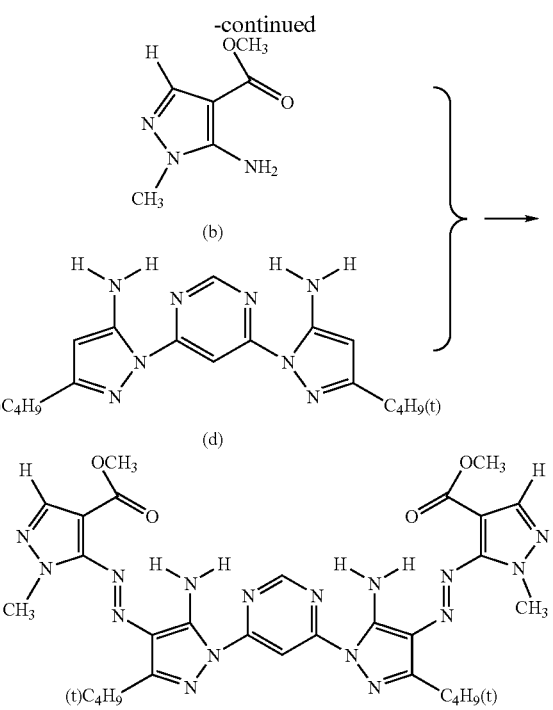

Pig.-1

(1) Synthesis of Intermediate (a)

42.4 g (0.4 mol) of trimethyl orthoformate, 20.4 g (0.2 mol) of acetic anhydride, and 0.5 g of p-toluenesulfonic acid were added to 29.7 g (0.3 mol) of methyl cyanoacetate, which was heated at 110° C. (outside temperature) and then stirred for 20 hours while a low-boiling-point component formed from the reaction system was distilled away. The reaction liquid was concentrated under reduced pressure. Thereafter, the resulting product was purified on a silica gel column, and 14.1 g of the intermediate (a) (yellow powder, yield: 30%) was obtained. The results of NMR measurement of the obtained intermediate (a) are shown below.

$^1$H-NMR (300 MHz, CDCl$_3$) 7.96 (s, 1H), 4.15 (s, 3H), 3.81 (s, 3H)

(2) Synthesis of Intermediate (b)

150 mL of i-propanol was added to 7.4 mL (141 mmol) of methylhydrazine, which was cooled to 15° C. (inside temperature). 7.0 g (49.6 mmol) of the intermediate (a) was gradually added to the mixed solution, which was then heated at 50° C. and stirred for 1 hour and 40 minutes. The reaction liquid was concentrated under reduced pressure. Thereafter, the resulting product was purified on a silica gel column, and 10.5 g of the intermediate (b) (white powder, yield: 50%) was obtained. The results of NMR measurement of the obtained intermediate (b) are shown below.

$^1$H-NMR (300 MHz, CDCl$_3$) 7.60 (s, 1H), 4.95 (brs, 2H), 3.80 (s, 3H), 3.60 (s, 3H)

(3) Synthesis of Intermediate (c)

100 mL of methanol was added to 130 mL of hydrazine monohydrate, which was cooled to 10° C. (inside temperature). 50.0 g (336 mmol) of 4,6-dichloropyrimidine was gradually added to the mixed solution (inside temperature: 20° C. or lower), which was then heated at 50° C. and stirred for 4 hours and 30 minutes. A crystal precipitated from the reaction liquid was filtered, washed with i-propanol, and dried. Thereby, 43.1 g of the intermediate (c) (white powder, yield: 92%) was obtained. The results of NMR measurement of the obtained intermediate (c) are shown below.

$^1$H-NMR (300 MHz, $d_6$-DMSO) 7.82 (s, 1H), 7.55 (s, 2H), 5.96 (s, 1H), 4.12 (s, 4H)

(4) Synthesis of Intermediate (d)

900 mL of water was added to 35.0 g (0.25 mol) of the intermediate (c) and 68.8 g (0.55 mol) of pivaloylacetonitrile, which was stirred at room temperature. 1 M hydrochloric acid aqueous solution was added dropwise into the suspension so as to give the pH of 3, which was then heated at 50° C. and stirred for 8 hours.

8 M potassium hydroxide aqueous solution was added dropwise into the reaction liquid, so as to adjust the pH to 8. Further, 1 M hydrochloric acid aqueous solution was added dropwise thereto so as to give the pH of 6. The precipitated crystal was filtered, washed with i-propanol, and dried. Thereby, 83.0 g of the intermediate (d) (white powder, yield: 94%) was obtained. The results of NMR measurement of the obtained intermediate (d) are shown below.

$^1$H-NMR (300 MHz, $d_6$-DMSO) 8.73 (s, 1H), 7.97 (s, 1H), 6.88 (s, 4H), 5.35 (s, 2H), 1.22 (s, 18H)

(5) Synthesis of Exemplary compound (Pig.-1)

18.5 mL of acetic acid was added to 4.1 mL of concentrated sulfuric acid, which was cooled on ice and stirred. 3.85 g (12.1 mmol) of 40% nitrosylsulfuric acid was added dropwise thereto. 1.71 g (11.0 mmol) of the intermediate (b) was gradually added to the mixed solution (inside temperature: 0° C. or lower), which was then stirred at 0° C. for 2 hours. 150 mg of urea was added to the reaction liquid, which was stirred at 0° C. for 15 minutes to prepare a diazo solution A.

50 mL of methanol was added to the intermediate (d), which was heated and dissolved. Then, the resulting mixed solution was cooled on ice and stirred. The diazo solution A was slowly added dropwise to the mixed solution (inside temperature: 10° C. or lower). The reaction liquid was stirred at room temperature for 2 hours. A crystal precipitated was filtered, washed with methanol. Thereby, a crude crystal of the Exemplary compound (Pig.-1) was obtained. Further, water was added to the crude crystal, which was stirred. The pH of the suspension was adjusted to 7 using a sodium hydroxide aqueous solution. 20 mL of dimethylacetamide was added thereto and stirred at 80° C. for 2 hours. A crystal precipitated was filtered and was suspended and washed with methanol. The obtained crystal was filtered and dried to give 2.0 g of the Exemplary compound (Pig.-1) (yellow powder, yield: 79%).

Exemplary compounds (Pig.-18), (Pig.-49), and (Pig.-52) were synthesized in a manner substantially similar to the synthetic scheme described above.

Synthesis Example 2

Synthesis of Styrene-Acrylic Acid Copolymer

The components having the following monomer formulation were mixed so that the sum of the all monomer components was 100 parts by mass. As a polymerization initiator, 1 part by mass of 2,2'-azobis(2,4-dimethylvaleronitrile) was added thereto. Then, the nitrogen gas replacement was sufficiently carried out and a synthetic mixture was obtained.

Formulation of Monomers for Forming Styrene-Acrylic Acid Copolymer

| | |
|---|---|
| Styrene | 50 parts by mass |
| Acrylic acid | 8 parts by mass |
| Methacrylic acid | 7 parts by mass |
| Methyl methacrylate | 35 parts by mass |
| 2-mercaptoethanol | 0.1 part by mass |

Subsequently, while 100 parts by mass of methyl ethyl ketone was stirred under nitrogen atmosphere, the temperature was increased to 70° C. While the compound was stirred at 70° C., the synthetic mixture was added dropwise into the compound over 3 hours. Further, the reaction was continued while the mixture was stirred at 75° C. for 3 hours. Then, the synthetic compound was naturally cooled to 25° C. Thereafter, methyl ethyl ketone was added thereto so as to have a solid content of 50% to obtain a solution of styrene-acrylic acid copolymer having a weight average molecular weight of 40000.

Herein, the weight average molecular weight was measured by gel permeation chromatography (GPC) an expressed by converting in terms of polystyrene. The columns TSKGEL SUPER HZM-H, TSKGEL SUPER HZ4000, and TSKGEL SUPER HZ2000 (all trade names, manufactured by Tosoh Corporation) were used.

Example 1

5 mol/L sodium hydroxide aqueous solution was added to a mixture containing 8 parts by mass of the 50% styrene-acrylic acid copolymer solution resulted in the Synthesis example 2, 8 parts by mass of methylethylketone, and 40 parts by mass of water. In this regard, an amount of alkali which completely neutralizes methacrylic acid or acrylic acid in the styrene-acrylic acid copolymer was added. The Exemplary compound (Pig.-1), i.e., the azo pigment according to the invention (10 parts by mass) was added thereto, which was kneaded using a roll mill for 2 hours to 8 hours as needed. Thereafter, the kneaded product was dispersed. The organic solvent was completely removed from the obtained dispersion under reduced pressure at 55° C. The resulting product was concentrated by removing water so that a water dispersion of vinyl polymer particles containing the azo pigment having a solid content of 21% was obtained.

30 parts by mass of the water dispersion of vinyl polymer particles containing the azo pigment, 1 part of an alkyleneoxide adduct of 2,4,7,9-tetramethyl-5-decyne-4,7-diol (trade name: OLFIN E 1010, manufactured by Nissin Chemical Industry Co., Ltd.), and respective amounts of the respective water-soluble organic solvents shown in the following Table 1, and ion-exchanged water of an amount to fill up the resultant to 100 parts, were mixed to prepare water-based inks for inkjet recording of Samples 101 to 135. The pH of each of the water-based inks was measured using a pH meter (trade name: WM-50EG, manufactured by DKK-TOA CORPORATION) to turn out as 8.5.

Evaluation of Ejection Stability (Accuracy in Ejection of Ink)

The obtained water-based ink for inkjet recording was placed into a container made of PET, which was then sealed and left at 65° C. for 2 weeks.

COLOR PHOTOFINISHING PRO (trade name; manufactured by FUJIFILM Corporation) was used as the recording medium and 16 lines were printed using an inkjet recording apparatus (trade name: DMP-2831 PRINTER, manufactured by FUJIFILM Dimatix Inc.) under the conditions of ink droplet amount of 2 µL, ejection frequency of 20 kHz, and resolution of 16×1200 dpi (nozzle array direction×derivary direction).

The distances between lines in a region which is 5 cm-apart from the initiation site of dotting with droplets on the obtained printed medium were measured with a dot analyzer DA-6000 (trade name, manufactured by Oji Scientific Instruments), and the standard deviation of the measured distances was calculated. From the obtained value, the accuracy in ejection direction was evaluated under the following evaluation criteria.

Evaluation Criteria

AA: The standard deviation is less than 2 μm.

A: The standard deviation is 2 μm or more and less than 4 μm.

B: Practically minimum tolerable. The standard deviation is 4 μm or more and less than 6 μm.

C: The standard deviation is 6 μm or more.

TABLE 1

| Experiment No. | Pigment | Water-soluble organic solvent 1 | | Water-soluble organic solvent 2 | | Water-soluble organic solvent 3 | | Ejection Accuracy | Note |
|---|---|---|---|---|---|---|---|---|---|
| | | Solvent | Part | Solvent | Part | Solvent | Part | | |
| Sample 101 | Exemplary compound (Pig. 1) | 1,2-Hexanediol | 0.1 | Glycerine | 19.9 | None | — | B | The invention |
| Sample 102 | Exemplary compound (Pig. 1) | 1,2-Hexanediol | 1 | Glycerine | 19 | None | — | A | The invention |
| Sample 103 | Exemplary compound (Pig. 1) | 1,2-Hexanediol | 5 | Glycerine | 15 | None | — | A | The invention |
| Sample 104 | Exemplary compound (Pig. 1) | 1,2-Hexanediol | 10 | Glycerine | 10 | None | — | A | The invention |
| Sample 105 | Exemplary compound (Pig. 1) | 1,2-Hexanediol | 12 | Glycerine | 8 | None | — | B | The invention |
| Sample 106 | Exemplary compound (Pig. 1) | 1,2-Hexanediol | 5 | Glycerine | 3 | None | — | B | The invention |
| Sample 107 | Exemplary compound (Pig. 1) | 1,2-Hexanediol | 5 | Glycerine | 5 | None | — | A | The invention |
| Sample 108 | Exemplary compound (Pig. 1) | 1,2-Hexanediol | 5 | Glycerine | 25 | None | — | B | The invention |
| Sample 109 | C.I. Pigment Yellow 74 | 1,2-Hexanediol | 0.1 | Glycerine | 19.9 | None | — | C | Comparative Example |
| Sample 110 | C.I. Pigment Yellow 74 | 1,2-Hexanediol | 1 | Glycerine | 19 | None | — | C | Comparative Example |
| Sample 111 | C.I. Pigment Yellow 74 | 1,2-Hexanediol | 5 | Glycerine | 15 | None | — | C | Comparative Example |
| Sample 112 | C.I. Pigment Yellow 74 | 1,2-Hexanediol | 10 | Glycerine | 10 | None | — | C | Comparative Example |
| Sample 113 | C.I. Pigment Yellow 74 | 1,2-Hexanediol | 12 | Glycerine | 8 | None | — | C | Comparative Example |

TABLE 2

| Sample No. | Pigment | Water-soluble organic solvent 1 | | Water-soluble organic solvent 2 | | Water-soluble organic solvent 3 | | Ejection Accuracy | Note |
|---|---|---|---|---|---|---|---|---|---|
| | | Solvent | Part | Solvent | Part | Solvent | Part | | |
| Sample 114 | C.I. Pigment Yellow 74 | 1,2-Hexanediol | 5 | Glycerine | 3 | None | — | C | Comparative Example |
| Sample 115 | C.I. Pigment Yellow 74 | 1,2-Hexanediol | 5 | Glycerine | 5 | None | — | C | Comparative Example |
| Sample 116 | C.I. Pigment Yellow 74 | 1,2-Hexanediol | 5 | Glycerine | 25 | None | — | C | Comparative Example |
| Sample 117 | Exemplified compound (Pig. 1) | 1,2-Hexanediol | 5 | Trimethylol propane | 15 | None | — | A | The invention |
| Sample 118 | Exemplified compound (Pig. 1) | 1,2-Hexanediol | 5 | 2-Butyl-2-ethyl-1,3-propanediol | 15 | None | — | A | The invention |
| Sample 119 | Exemplified compound (Pig. 1) | 4-Methyl-1,2-pentanediol | 5 | Glycerine | 15 | None | — | A | The invention |
| Sample 120 | Exemplified compound (Pig. 1) | 1,2-Hexanediol | 5 | Glycerine | 10 | Triethylene glycol monobutyl ether | 5 | AA | The invention |
| Sample 121 | Exemplified compound (Pig. 1) | 1,2-Hexanediol | 5 | Glycerine | 10 | Triethylene glycol monobutyl ether | 0.1 | A | The invention |
| Sample 122 | Exemplified compound (Pig. 1) | 1,2-Hexanediol | 5 | Glycerine | 10 | Triethylene glycol monobutyl ether | 0.5 | AA | The invention |
| Sample 123 | Exemplified compound (Pig. 1) | 1,2-Hexanediol | 5 | Glycerine | 10 | Triethylene glycol monobutyl ether | 15 | AA | The invention |
| Sample 124 | Exemplified compound (Pig. 1) | 1,2-Hexanediol | 5 | Glycerine | 10 | Triethylene glycol monobutyl ether | 20 | A | The invention |
| Sample 125 | Exemplified compound (Pig. 1) | 1,2-Hexanediol | 5 | Trimethylol propane | 10 | Triethylene glycol monobutyl ether | 5 | AA | The invention |
| Sample 126 | Exemplified compound (Pig. 1) | 1,2-Hexanediol | 5 | 2-Butyl-2-ethyl-1,3-propanediol | 10 | Triethylene glycol monobutyl ether | 5 | AA | The invention |

TABLE 3

| Sample No. | Pigment | Water-soluble organic solvent 1 Solvent | Part | Water-soluble organic solvent 2 Solvent | Part | Water-soluble organic solvent 3 Solvent | Part | Ejection Accuracy | Note |
|---|---|---|---|---|---|---|---|---|---|
| Sample 127 | Exemplified compound (Pig. 18) | 1,2-Hexanediol | 5 | Glycerine | 15 | None | — | A | The invention |
| Sample 128 | Exemplified compound (Pig. 21) | 1,2-Hexanediol | 5 | Glycerine | 15 | None | — | A | The invention |
| Sample 129 | Exemplified compound (Pig. 33) | 1,2-Hexanediol | 5 | Glycerine | 15 | None | — | A | The invention |
| Sample 130 | Exemplified compound (Pig. 1) | 2-Pyrrolidone | 5 | Glycerine | 15 | None | — | C | Comparative Example |
| Sample 131 | Exemplified compound (Pig. 1) | 1,3-Dimethyl-2-imidazolidinone | 5 | Glycerine | 15 | None | — | C | Comparative Example |
| Sample 132 | Exemplified compound (Pig. 1) | Sulforane | 5 | Glycerine | 15 | None | — | C | Comparative Example |
| Sample 133 | Exemplified compound (Pig. 1) | 1,2-Hexanediol | 5 | 2-Pyrrolidone | 15 | None | — | C | Comparative Example |
| Sample 134 | Exemplified compound (Pig. 1) | 1,2-Hexanediol | 5 | 1,3-Dimethyl-2-imidazolidinone | 15 | None | — | C | Comparative Example |
| Sample 135 | Exemplified compound (Pig. 1) | 1,2-Hexanediol | 5 | Sulforane | 15 | None | — | C | Comparative Example |

From Samples 101 to 108, it is found that excellent ink ejection accuracy may be obtained even after storage at high temperatures when the Exemplary compound (Pig.-1) as the azo pigment, 0.5% by mass to 10% by mass of 1,2-alkylene glycol having from 4 to 10 carbon atoms and 5% by mass to 20% by mass of a polyvalent alcohol that is not the 1,2-alkylene glycol are used.

From Samples 109 to 116, it is found that the ink ejection accuracy may be deteriorated when, as the azo pigment, C. I. PigmentYellow 74 is used in place of the Exemplary compound (Pig.-1).

From Samples 117 to 118, it is found that excellent ink ejection accuracy may be obtained even when, as the polyvalent alcohol, trimethylolpropane or 2-butyl-2-ethyl-1,3-propanediol is used in place of glycerine.

From Sample 119, it is found that excellent ink ejection accuracy may be obtained even when trimethylolpropane or 4-methyl-2-1,2-pentanediol is used as the 1,2-alkylene glycol.

From Samples 120 to 126, it is found that specifically excellent ink ejection accuracy may be obtained when triethyleneglycol monobutylether, which is an example of glycolether, is used as the third solvent.

From Samples 127 to 129, it is found that excellent ink ejection accuracy may be obtained even when any one of the Exemplary compounds (Pig.-18), (Pig.-21), and (Pig.-33) is used in place of the Exemplary compound (Pig.-1).

From Samples 130 to 135, it is found that the ink ejection accuracy may be deteriorated when solvents used therein are outside the scope of the water-soluble organic solvents to be used in the invention.

Example 2

Synthesis Example 3

Synthesis of Vinyl Copolymer Having Aromatic Ring Bonded Via Linking Group to Main Chain The components having the following monomer formulation were mixed so that the sum of the all monomer components was 100 parts by mass. As a polymerization initiator, 1 part by mass of 2,2'-azobis(2,4-dimethylvaleronitrile) was added thereto. Then, the nitrogen gas replacement was sufficiently carried out and a synthetic mixture was obtained.

Formulation of Monomers for Forming Vinyl Copolymer

| | |
|---|---|
| Phenoxyethyl methacrylate | 40 parts by mass |
| Methyl methacrylate | 48 parts by mass |
| Methacrylic acid | 12 parts by mass |
| 2-mercaptoethanol | 0.1 part by mass |

Subsequently, while 100 parts by mass of methyl ethyl ketone was stirred under nitrogen atmosphere, the temperature was increased to 75° C. While the compound was stirred at 75° C., the synthetic mixture was added dropwise into the compound over 32 hours. Further, the reaction was continued while the mixture was stirred at 75° C. for 4 hours. Then, the synthetic compound was naturally cooled to 25° C. Thereafter, methyl ethyl ketone was added thereto so as to have a solid content of 50% to obtain a solution of a vinyl copolymer having an aromatic ring bonded via a linking group to a main chain thereof and having a weight average molecular weight of 35000.

Water-based inks for inkjet recording of samples of Example 2 were prepared and subjected to the evaluation in the similar manner as the samples of Example 1 except that the vinyl copolymer was used in place of the styrene-acrylic acid copolymer, and turned out that the thus-prepared samples of the invention revealed excellent ink ejection accuracy that is similar to those of the samples of the invention shown in Example 1.

Example 3

Water-based inks for inkjet recording of samples of Example 3 were prepared and subjected to the evaluation in the similar manner as the samples of Example 1 except that the alkyleneoxide adduct of 2,4,7,9-tetramethyl-5-decyne-4,7-diol (trade name: OLFIN E 1010, described above) was changed to 2,4,7,9-tetramethyl-5-decyne-4,7-diol, 3,6-dimethyl-4-octine-3,6-diol, or an alkyleneoxide adduct of 3,6-dimethyl-4-octine-3,6-diol. It turned out that the thus-prepared samples of the invention revealed excellent ink ejection accuracy that is similar to those of the samples of the invention shown in Example 1.

Example 4

Water-based inks for inkjet recording of samples of Example 4 were prepared and subjected to the evaluation in the similar manner as the samples of Examples 1 to 3 except that the inks were placed into a container made of high density polyethylene, which was then sealed and left at room temperature for 3 months in place of being placed into the PET container to be sealed and left at 65° C. for 2 weeks. It turned out that the thus-prepared samples of the invention revealed excellent ink ejection accuracy that is similar to those of the samples of the invention shown in Examples 1 to 3.

Example 5

Water-based inks for inkjet recording of samples of Example 5 were prepared and subjected to the evaluation in the similar manner as the samples of Examples 1 to 4 except that the recording medium COLOR PHOTOFINISHING PRO (trade name, described above) was changed to YOU RIGHT (trade name, manufactured by Nippon Paper Industries Co., Ltd.), XEROX 4024 (trade name, manufactured by Fuji Xerox Co., Ltd.), OK PRINCE HIGH QUALITY (trade name, manufactured by Oji Paper Co., Ltd.), SHIORAI (trade name, manufactured by Nippon Paper Industries Co., Ltd.), OK EVER LIGHT COAT (trade name, manufactured by Oji Paper Co., Ltd.), AURORA COAT (trade name, manufactured by Nippon Paper Industries Co., Ltd.) or TOKUBISHI ART (trade name, manufactured by Mitsubishi Paper Mills Limited). It turned out that the thus-prepared samples of the invention revealed excellent ink ejection accuracy that is similar to those of the samples of the invention shown in Examples 1 to 4.

All publications, patent applications, and technical standards mentioned in this specification are herein incorporated by reference to the same extent as if such individual publication, patent application, or technical standard was specifically and individually indicated to be incorporated by reference. It will be obvious to those having skill in the art that many changes may be made in the above-described details of the preferred embodiments of the present invention. It is intended that the scope of the invention be defined by the following claims and their equivalents.

What is claimed is:

1. A water-based ink for inkjet recording, the water-based ink comprising:
   a vinyl polymer particle comprising an azo compound represented by Formula (1), a tautomer of the azo compound, a salt of the azo compound a salt of the tautomer, a hydrate of the azo compound, a hydrate of the tautomer, or any combination thereof;
   1,2-alkylene glycol having from 4 to 10 carbon atoms; and
   a polyvalent alcohol that is not the 1,2-alkylene glycol and that has at most 10 carbon atoms:

Formula (1)

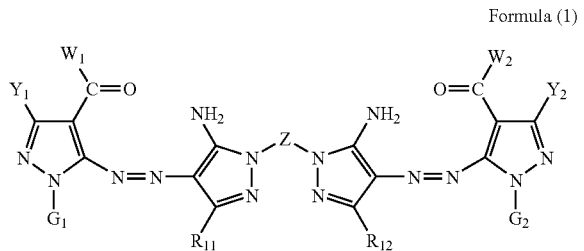

wherein, in Formula (1): Z represents a divalent group having a 5- to 8-membered nitrogen-containing heterocycle;

$Y_1$ and $Y_2$ each independently represent a hydrogen atom, a halogen atom, an alkyl group, an aralkyl group, an alkenyl group, an alkynyl group, an aryl group, a heterocyclic group, a cyano group, a hydroxy group, a nitro group, an alkoxy group, an aryloxy group, a silyloxy group, a heterocyclic oxy group, an acyloxy group, a carbamoyloxy group, an alkoxycarbonyloxy group, an aryloxycarbonyloxy group, an amino group, an acylamino group, an aminocarbonylamino group, an alkoxycarbonylamino group, an aryloxycarbonylamino group, a sulfamoylamino group, an alkylsulfonylamino group, an arylsulfonylamino group, a mercapto group, an alkylthio group, an arylthio group, a heterocyclic thio group, a sulfamoyl group, an alkylsulfinyl group, an arylsulfinyl group, an alkylsulfonyl group, an arylsulfonyl group, an acyl group, an aryloxycarbonyl group, an alkoxycarbonyl group, a carbamoyl group, an arylazo group, a heterocyclic azo group, an imido group, a phosphino group, a phosphinyl group, a phosphinyloxy group, a phosphinylamino group, or a silyl group;

$R_{11}$ and $R_{12}$ each independently represent a hydrogen atom, a straight chain or branched alkyl group having from 1 to 12 carbon atoms; a straight chain or branched aralkyl group having from 7 to 18 carbon atoms; a straight chain or branched alkenyl group having from 2 to 12 carbon atoms; a straight chain or branched alkynyl group having from 2 to 12 carbon atoms; a straight chain or branched cycloalkyl group having from 3 to 12 carbon atoms; a straight chain or branched cycloalkenyl group having from 3 to 12 carbon atoms; a halogen atom; an aryl group; a heterocyclic group; a cyano group; a hydroxy group; a nitro group; a carboxy group; an amino group; an alkyloxy group; an aryloxy group; an acylamino group; an alkylamino group; an arylamino group; a ureido group; a sulfamoylamino group; an alkylthio group; an arylthio group; an alkyloxycarbonylamino group; an alkylsulfonylamino group; an arylsulfonylamino group; a carbamoyl group; a sulfamoyl group; a sulfonyl group; an alkyloxycarbonyl group; a heterocyclic oxy group; an azo group; an acyloxy group; a carbamoyloxy group; a silyloxy group; an aryloxycarbonylamino group; an imido group; a heterocyclic thio group; a sulfinyl group; a phosphonyl group; an aryloxycarbonyl group; an acyl group; or an ionic hydrophilic group;

$G_1$ and $G_2$ each independently represent a hydrogen atom, an alkyl group, a cycloalkyl group, an aralkyl group, an alkenyl group, an alkynyl group, an aryl group or a heterocyclic group; and $W_1$ and $W_2$ each independently represent an alkoxy group, an amino group, an alkyl group, or an aryl group, and wherein the water-based ink comprises a content of 0.05% by mass to 2% by mass based on the total amount of the water-based ink, at least one selected from the group consisting of 2,4,7,9-tetramethyl-5-decyne-4,7-diol, 3,6-dimethyl-4-octine-3,6-diol, an alkyleneoxide adduct of 2,4,7,9-tetramethyl-5-decyne-4,7-diol, and an alkyleneoxide adduct of 3,6-dimethyl-4-octine-3,6-diol.

2. The water-based ink for inkjet recording of claim 1, further comprising a glycol ether represented by Formula (I):

$$R^1O-(AO)_m-H \qquad \text{Formula (I)}$$

wherein, in Formula (I), in represents an integer of 1 or more, A represents —$CH_2CH_2$— or —$CH_2CH(CH_3)$—, and $R^1$ represents an alkyl group having 8 or fewer carbon atoms.

3. The water-based ink for inkjet recording of claim 1, wherein the polyvalent alcohol comprises at least one selected from the group consisting of glycerine, trimethylolpropane and 2-butyl-2-ethyl-1,3-propanediol.

4. The water-based ink for inkjet recording of claim 1, wherein, in Formula (1), $W_1$ and $W_2$ each independently represent an alkoxy group having 3 or fewer carbon atoms, an amino group, or an alkylamino group having 3 or fewer carbon atoms.

5. The water-based ink for inkjet recording of claim 1, wherein, in Formula (1), $G_1$ and $G_2$ each independently represent an alkyl group having 3 or fewer carbon atoms.

6. The water-based ink for inkjet recording of claim 1, wherein, in Formula (1), Z represents a divalent group having a 6-membered nitrogen-containing heterocycle.

7. The water-based ink for inkjet recording of claim 1, wherein, in Formula (1), $Y_1$ and $Y_2$ each independently represent a hydrogen atom, an alkyl group, an aryl group, a heterocyclic group, or an alkylthio group; and $R_{11}$ and $R_{12}$ each independently represent an acylamino group having from 1 to 8 carbon atoms, an alkyl group having from 1 to 12 carbon atoms, an aryl group having from 6 to 18 carbon atoms, or a heterocyclic group having from 4 to 12 carbon atoms.

8. The water-based ink for inkjet recording of claim 1, wherein, in Formula (1), $Y_1$ and $Y_2$ each independently represent a hydrogen atom, a methyl group, a phenyl group, or a methylthio group; and $R_{11}$ and $R_{12}$ each independently represent as straight chain or branched alkyl group having from 1 to 8 carbon atoms.

9. The water-based ink for inkjet recording of claim 1, wherein, in Formula (1), $Y_1$ and $Y_2$ each independently represent a hydrogen atom; and $R_{11}$ and $R_{12}$ each independently represent a methyl group or a t-butyl group.

* * * * *